(12) United States Patent
Kawano

(10) Patent No.: US 10,291,793 B2
(45) Date of Patent: May 14, 2019

(54) SERVER APPARATUS PROVIDING PORTABLE INFORMATION TERMINAL AND IMAGE FORMING APPARATUS WITH CLOUD IMAGE PROCESSING SERVICE

(71) Applicant: Sharp Kabushiki Kaisha, Sakai, Osaka (JP)

(72) Inventor: Shinichi Kawano, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 71 days.

(21) Appl. No.: 15/602,135

(22) Filed: May 23, 2017

(65) Prior Publication Data

US 2017/0257493 A1 Sep. 7, 2017

Related U.S. Application Data

(60) Continuation of application No. 14/723,582, filed on May 28, 2015, now Pat. No. 9,692,915, which is a (Continued)

(30) Foreign Application Priority Data

Nov. 22, 2011 (JP) ................................. 2011-254795

(51) Int. Cl.
*H04N 1/00* (2006.01)
*G06F 3/12* (2006.01)
(Continued)

(52) U.S. Cl.
CPC .......... *H04N 1/001* (2013.01); *G06F 3/1204* (2013.01); *G06F 3/1222* (2013.01);
(Continued)

(58) Field of Classification Search
CPC .. H04N 1/001; H04N 1/00339; H04L 63/083; G06F 3/1286; G06F 3/1254;
(Continued)

(56) References Cited

U.S. PATENT DOCUMENTS 7,861,282 B2 * 12/2010 Kakigi .................. G06F 21/608
726/1
9,019,535 B1 * 4/2015 Hansen ................. G06F 3/1203
358/1.13
(Continued)

OTHER PUBLICATIONS

Asad, "How to enable fast user switching in windows xp and windows vista" <https://www.addictivetips.com/windows-tips/how-to-enable-disable-fast-user-switching-in-windows-xp-and-windows-vista/>, pp. 1-8 dated Nov. 5, 2008 (Year: 2008).*
(Continued)

*Primary Examiner* — Ming Y Hon
(74) *Attorney, Agent, or Firm* — Keating & Bennett, LLP

(57) ABSTRACT

An image forming apparatus 176 capable of easy log-in to a desired cloud service includes a print engine communicable with a cloud server 170 for printing a print job received from cloud server 170, a reader/writer 174 capable of proximity communication with a portable terminal 172, and a log-in executing device receiving log-in information to cloud server 170 from portable terminal 172 through reader/writer 174, for executing the log-in process to cloud server 170 using the log-in information.

4 Claims, 18 Drawing Sheets

Related U.S. Application Data division of application No. 14/356,895, filed as application No. PCT/JP2012/070977 on Aug. 20, 2012, now abandoned.

(51) Int. Cl.
| | | |
|---|---|---|
| *G06F 21/44* | (2013.01) | |
| *H04L 9/32* | (2006.01) | |
| *H04N 1/21* | (2006.01) | |
| *H04N 1/44* | (2006.01) | |
| *G06F 21/60* | (2013.01) | |
| *H04L 29/06* | (2006.01) | |

(52) U.S. Cl.
CPC .......... *G06F 3/1236* (2013.01); *G06F 3/1238* (2013.01); *G06F 3/1254* (2013.01); *G06F 3/1286* (2013.01); *G06F 3/1287* (2013.01); *G06F 3/1288* (2013.01); *G06F 21/44* (2013.01); *G06F 21/608* (2013.01); *H04L 9/3215* (2013.01); *H04L 63/083* (2013.01); *H04N 1/00244* (2013.01); *H04N 1/00339* (2013.01); *H04N 1/2191* (2013.01); *H04N 1/444* (2013.01); *H04N 1/4426* (2013.01); *G06F 3/1267* (2013.01); *G06F 2221/2115* (2013.01); *G06F 2221/2117* (2013.01); *H04L 63/0853* (2013.01); *H04N 2201/006* (2013.01); *H04N 2201/0039* (2013.01); *H04N 2201/0041* (2013.01); *H04N 2201/0096* (2013.01)

(58) Field of Classification Search
CPC .... G06F 21/608; G06F 3/1288; G06F 3/1287; G06F 3/1222
See application file for complete search history.

(56) References Cited

U.S. PATENT DOCUMENTS

| | | | | |
|---|---|---|---|---|
| 2003/0081247 A1* | 5/2003 | Sharma | ................ | G06F 21/608 358/1.15 |
| 2005/0078335 A1* | 4/2005 | Morris-Jones | ..... | H04N 1/00342 358/1.15 |
| 2006/0077431 A1* | 4/2006 | Zhang | ................ | H04N 1/00204 358/1.15 |
| 2007/0180503 A1* | 8/2007 | Li | ........................... | H04L 63/06 726/5 |
| 2007/0223050 A1* | 9/2007 | Someya | ............ | G06F 17/30011 358/404 |
| 2007/0226354 A1* | 9/2007 | Bang | ...................... | G06Q 30/04 709/227 |
| 2008/0028438 A1* | 1/2008 | Sakakibara | ........... | G06F 21/608 726/2 |
| 2008/0291283 A1* | 11/2008 | Achiwa | .............. | H04N 1/00204 348/207.2 |
| 2009/0024531 A1* | 1/2009 | Yamahata | ............... | G06F 21/31 705/55 |
| 2009/0080021 A1* | 3/2009 | Matsugashita | ........ | G06F 21/608 358/1.15 |
| 2009/0268229 A1* | 10/2009 | Richardson | ........... | G06K 15/00 358/1.15 |
| 2010/0208298 A1* | 8/2010 | Kitagata | ............... | G06F 3/1207 358/1.15 |
| 2011/0075176 A1* | 3/2011 | Nishio | ................... | G06F 3/1205 358/1.13 |
| 2011/0145329 A1* | 6/2011 | Fukasawa | .......... | H04N 1/00411 709/203 |
| 2011/0176162 A1* | 7/2011 | Kamath | ................ | G06F 3/1204 358/1.15 |
| 2011/0216347 A1* | 9/2011 | Kikuchi | ................. | G06K 15/02 358/1.14 |
| 2011/0235085 A1* | 9/2011 | Jazayeri | ................ | G06F 3/1204 358/1.14 |
| 2011/0299110 A1* | 12/2011 | Jazayeri | ................ | G06F 3/1204 358/1.15 |
| 2011/0317215 A1* | 12/2011 | Ida | ........................ | G06F 3/1222 358/1.15 |
| 2012/0120436 A1* | 5/2012 | Damera-Venkata | ........................ | G06F 3/1208 358/1.13 |
| 2012/0222101 A1* | 8/2012 | Iwasaki | ............... | H04L 63/0823 726/7 |
| 2012/0229844 A1* | 9/2012 | Yada | .................... | H04N 1/0023 358/1.15 |
| 2013/0021638 A1* | 1/2013 | Hong | .................... | G06F 3/1204 358/1.14 |
| 2013/0044343 A1* | 2/2013 | Matsugashita | ........ | G06F 3/1222 358/1.14 |
| 2013/0107314 A1* | 5/2013 | Steely | ................... | G06F 3/1204 358/1.15 |
| 2013/0111045 A1* | 5/2013 | Ichikawa | .............. | H04L 67/143 709/228 |
| 2013/0222840 A1* | 8/2013 | Hosoda | ............. | H04N 1/00204 358/1.14 |
| 2014/0218762 A1* | 8/2014 | Abe | ................... | G06K 15/1803 358/1.15 |
| 2014/0373103 A1* | 12/2014 | Hirata | .................... | G06F 21/31 726/4 |
| 2018/0203652 A1* | 7/2018 | Narita | ................... | G06F 3/1236 |

OTHER PUBLICATIONS

Kawano, "Server Apparatus Providing Portable Information Terminal and Image Forming Apparatus with Cloud Image Processing Service", U.S. Appl. No. 14/723,582, filed May 28, 2015.

\* cited by examiner

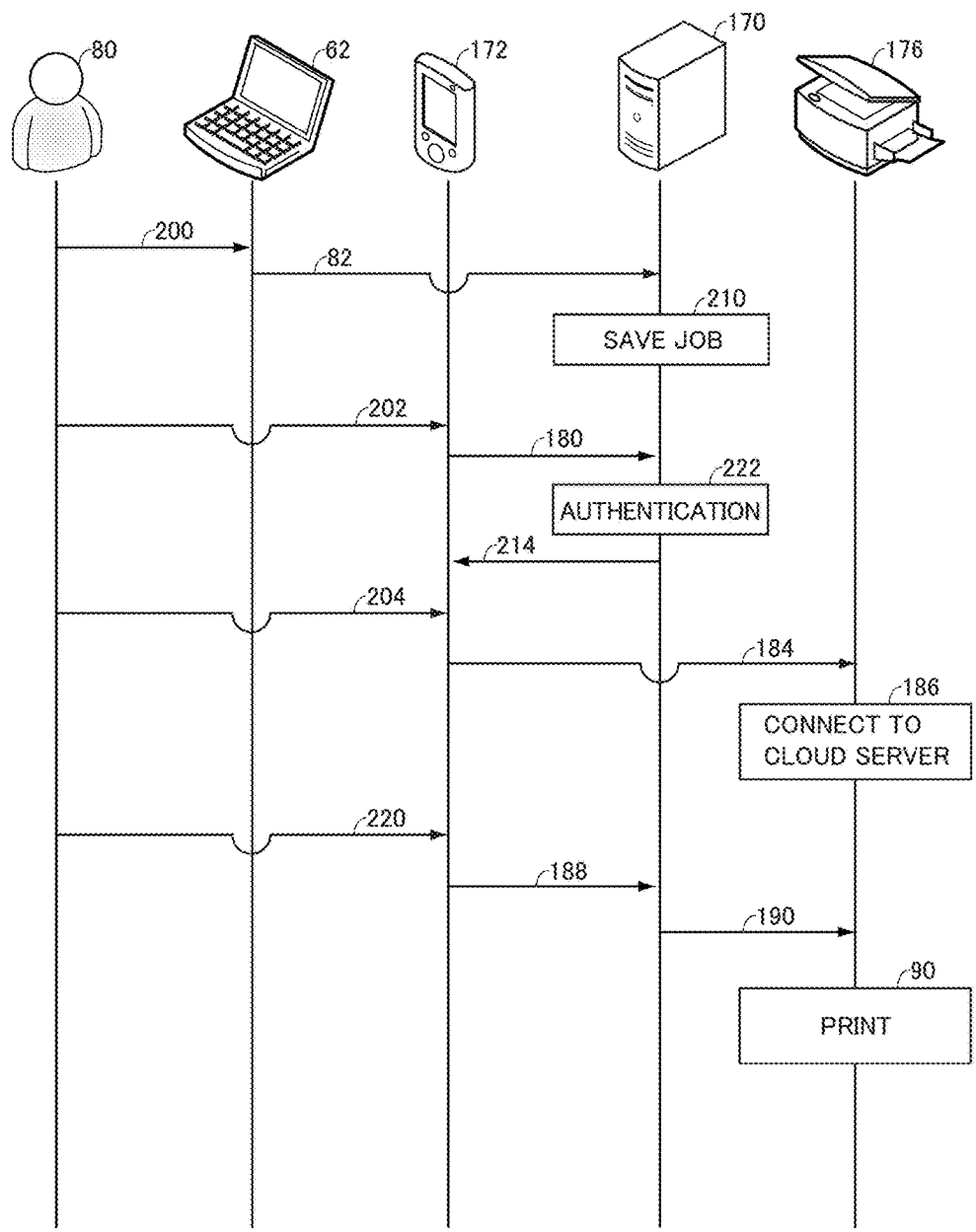

| COMPANY ID | USER NAME | TYPE OF LOGGED-IN DEVICE | ID INFO FOR LOGGED-IN DEVICE |
|---|---|---|---|
| COMPANY 1 | ANDO | SMARTPHONE VER1.X | 123.123.123.111 |
| COMPANY 1 | ANDO | MFP NO.1654 | 123.123.123.222 |
| ... | ... | ... | ... |
| ... | ... | ... | ... |

FIG. 18

| FILE NAME ▽△ | USER NAME ▽△ | JOB TYPE | COLOR INFO |
|---|---|---|---|
| ☐FIGURE 1 | ADMINISTRATOR | PRINTER | MONO |
| ☐FIGURE 2 | ADMINISTRATOR | PRINTER | MONO |
| ☐DOCUMENT 1 | USER 1 | PRINTER | AUTO |
| ☐DOCUMENT 2 | ADMINISTRATOR | PRINTER | AUTO |
| ☐DOCUMENT 3 | USER 1 | PRINTER | AUTO |
| ☐DOCUMENT 4 | USER 1 | PRINTER | AUTO |
| ☐PRESENTATION 1 | ADMINISTRATOR | PRINTER | AUTO |

TOTAL FILE NUMBER: 7
[PREVIOUS] 1/1 [NEXT]
[SELECT ALL] [DESELECT]

FILE PASSWORD
SELECT OPERATION
[PRINT] [SEND] [MOVE] [DELETE]

FIG. 19

USER AUTHENTICATION FAILED.

PLEASE ENTER USER INFORMATION AGAIN.

COMPANY ID:
LOG-IN NAME:
PASSWORD:

[LOG-IN]   [CANCEL]

SERVER APPARATUS PROVIDING PORTABLE INFORMATION TERMINAL AND IMAGE FORMING APPARATUS WITH CLOUD IMAGE PROCESSING SERVICE

TECHNICAL FIELD

The present invention relates to an image printing system including a multifunctional peripheral having communication and printing functions and, more specifically, to a system for outputting a document image from a so-called cloud server to a multifunctional peripheral or the like.

BACKGROUND ART

Recently, information processing apparatuses (personal computers) and portable terminals (smart-phones, tablets) come to be widely used and, consequently, image output apparatuses for outputting image data transmitted from an information processing apparatus or a portable terminal also come to be widely used. The image output apparatus includes a printer having only the printing function and an MFP (Multiple Function Peripheral) represented by a multifunctional peripheral having many functions such as scanner function, Fax function and E-mail transmitting function, in addition to the printing function.

Such an image output apparatus is often connected to a network such as LAN (Local Area Network). In an office, for example, it is common that a plurality of image output apparatuses are installed at a plurality of places. A user selects an image output apparatus to use, considering the installed place, or functions supported by each image output apparatus.

Particularly in offices, it is common to limit users who can use the image output apparatuses. For example, before using an image output apparatus, the user logs in from an information processing apparatus to the image output apparatus to generate a print job, or logs in to the image output apparatus when he/she uses the image output apparatus. Different from an information processing apparatus, most of the image output apparatuses are not provided with any keyboard or similar mechanism and, hence, input of log-in information is troublesome when the user is to log-in to the apparatus. As a solution, a card reader is provided on the image output apparatus, and the user can log-in by a simple operation of passing his/her identification card (ID card) through the card reader.

As a log-in operation, a technique of reading information from a card in a contactless manner or by proximity communication, such as an IC card, is becoming popular. By such a technique, log-in is becoming easier. Japanese Patent Laying-Open No. 2009-86976 discloses a technique in which, after a user is authenticated by waving a portable terminal over an image forming apparatus, a print job saved in the image forming apparatus can be displayed and its printing operation can be done on the portable apparatus.

On the other hand, a so-called cloud service is rapidly spreading, in which data is not stored in hardware provided in a company but the data is saved or applications are provided over the Internet. The image output system can also be provided as a part of the cloud service. In the following, such a service will be called a "cloud image output service." In the cloud service, the user often accesses data simply by using the name of service, not much paying attention to where on the network the server exists.

FIG. 1 schematically shows a configuration of an exemplary cloud image output service 50 possible with the present technique. Cloud image output service 50 represents a system in which print data (print job) is uploaded from an information processing apparatus, and the job is printed by a printer located at a position easily accessible to the user. Here, a user 80 transmits a print job 82 from an information processing apparatus 62 (client PC) through a printer driver to a cloud server 60. For this process, the printer driver opens a screen for entering log-in name and password to cloud server 60. Unless the user inputs necessary information, print job 82 is not transmitted to cloud server 60.

Receiving the print job 82, cloud server 60 extracts the log-in name and the password allocated to print job 82, and performs an authentication process for cloud server 60. If authentication is successful, cloud server 60 saves print job 82 as print job 84 in a storage device managed by cloud server 60.

Let us consider how user 80 obtains a print-out thereafter. Assume that user 80 uses an MFP 68 belonging to cloud image output service 50 as an output destination. Then, first, user 80 moves from information processing apparatus 62 to MFP 68 (86). In order to use MFP 68, the user 80 must access a log-in entering screen of cloud image output service 50 through a web browser (or a dedicated access program) of MFP 68. In this example, it is assumed that an IC card reader/writer 66 is connected to MFP 68 to enable use of MFP 68. User 80 waves his/her IC card 64 over reader/writer 66 to log-in to MFP 68. Then, the user operates an operation panel of MFP 68 to activate the web browser, and calls the log-in page of cloud server 60. After log-in, a home screen of cloud image output service (home screen 140 of FIG. 4) provided by cloud server 60 is displayed on the web browser.

Referring to FIG. 4, on home screen 140, a list 142 of print jobs, which user 80 saved in a cloud file cabinet service 100, is displayed. User 80 selects a desired print job from list 142 and operates a print instruction button 144, and thereby transmits a print instruction of the print job. Cloud server 60 transmits the designated print job 88 to MFP 68 from which the print instruction has been transmitted. MFP 68 receives print job 88 and outputs a print-out 90.

A similar service can be used using a service in which files are saved in a cloud server. Here, such a service is referred to as a cloud file cabinet service. Referring to FIG. 2, cloud file cabinet service 100 includes a cloud server 110, and the cloud file cabinet service can be used by information processing apparatus 62, MFP 68 and the like.

User 80 using the cloud file cabinet service creates a document file by operating information processing apparatus 62, and transmits the created document file 112 to cloud server 110. Specifically, user 80 designates a cloud server 110 on a network as the place to save the file. Cloud server 110 saves, on a user-by-user basis, the received document file 112 as document file 114.

When user 80 wants to get a print-out of document file 114, he/she moves to MFP 68 that is connectable to cloud file cabinet service 100, waves IC card 64 over reader/writer 66 and thereby logs in to MFP 68. The user activates the browser on MFP 68, and logs in to cloud file cabinet service 100 provided by cloud server 110. User 80 designates a desired file from among document files 114 saved in cloud server 110, and transmits a print instruction 116. Receiving the print instruction 116, cloud server 110 selects the designated document file 114 and conducts a process 118 of converting it to a print job. Further, cloud server 110 transmits the thus obtained print job 120 to MFP 68 from which print instruction 116 is received. MFP 68 receives print job 120 and outputs a print-out 122.

Using the cloud service, it becomes possible to save and print necessary document any time no matter where information processing apparatus 62 or MFP 68 is located, as long as network connection is available. By way of example, it is possible to create a business-related document on the road using information processing apparatus 62, save it as a print job in cloud server 60, and print the document using MFP 68 at a convenience store nearby. As a result, necessary document can be formed at any place.

CITATION LIST

Patent Literature

PTL 1: Japanese Patent Laying-Open No. 2009-86976

SUMMARY OF INVENTION

Technical Problem

As described above, the cloud service to which MFP 68 is connectable is very convenient and such a service will be more and more popular in the future. The following problem, however, may possibly arise as a result. Consider, for example, that MFP 68 is installed in a convenience store. Since a large number of general users use MFP 68, the number of cloud services possibly used by the users will also increase. A user who is going to use MFP 68 must select one intended service from among cloud services available on the MFP 68. If the number and type of cloud services available on the MFP increase, it would be confusing for the user to select the service to be accessed.

Referring to FIG. 3, when the user wishes to access MFP 68 and use a cloud service, by way of example, a menu 130 for selecting a cloud service is displayed. Selection menu 130 includes a plurality of options 132 representing a plurality of cloud services available on MFP 68. From the viewpoint of the operator operating MFP 68, it is desirable to have as many cloud services as possible available on MFP 68, so that many users can use MFP 68. Further, the number of services accessible from a MFP will increase more and more in the future. Therefore, selection menu 130 will be very long.

On the other hand, the number of services the user routinely uses will be reduced and eventually limited to a few. Therefore, the user naturally wishes to access his/her routine service quickly. The user, however, must select the service he/she uses from a very long selection menu 130 when using MFP 68. For this purpose, the user may possibly be forced to scroll selection menu 130 to the very bottom. Further, it becomes difficult to simply find the desired service. Thus, an MFP supporting larger number of services will be less and less convenient for the user.

Such a problem occurs not only when a print job or a document saved in the cloud service is to be printed by MFP 68 or the like but also when a document or print job is to be transmitted from information processing apparatus 62 to cloud server 60.

By the invention described in Patent Literature 1, though the operation of user 80 to log-in to MFP 68 can be simplified as described above, the operation for using the cloud service itself is not simplified.

Therefore, an object of the present invention is to provide an image forming apparatus, a server apparatus and an information processing apparatus allowing easy log-in to a desired cloud service.

Solution to Problem

According to a first aspect, the present invention provides an image forming apparatus, including: a first communication device communicable with a cloud service; and printing device configured to print a print job received from the cloud service through the first communication device. The image forming apparatus further includes: a second communication device configured to communicate with another apparatus through a proximity communication device for conducting proximity communication; and a log-in executing device, receiving log-in information from a portable information terminal to the cloud service through the proximity communication device and the second communication device, configured to execute a log-in process to the cloud service through the first communication device using the log-in information.

When log-in of an image forming apparatus to the cloud service is to be done, not the image forming apparatus but a portable terminal is used to log-in to the cloud service. Thereafter, when the portable terminal is moved closer to the proximity communication device, log-in information for log-in to the cloud service is transmitted by the second communication device and the log-in executing device to the image forming apparatus, and the image forming apparatus logs in to the cloud service. The image forming apparatus can log-in to the cloud service using the portable terminal, not using the image forming apparatus itself. Thus, even a user not familiar with the operation of image forming apparatus can easily have the image forming apparatus logged-in to the cloud service using, for example, his/her own portable information terminal.

Preferably, the first communication device is capable of communicating with a plurality of cloud services. The log-in executing device includes a device, receiving cloud service specifying information for specifying a cloud service and log-in information to the cloud service specified by the cloud service specifying information, from a portable information terminal through the proximity communication device and the second communication device, configured to log in to the cloud service specified by the cloud service specifying information through the first communication device, using the log-in information.

When a desired cloud service is to be selected from among a plurality of cloud services and to which the image forming apparatus is to be logged in, not the image forming apparatus but the portable information terminal of the user is used to have the image forming apparatus logged-in to the desired cloud service. To select the desired cloud service, it becomes unnecessary to operate the image forming apparatus with which operation the user is not familiar and, it becomes easier to use the image forming apparatus by using the image forming apparatus.

The image forming apparatus may further include a log-in inhibiting device configured to inhibit, as long as a user who has logged in to the cloud service through the log-in executing device is being logged in to the cloud service, log-in by another user through the log-in executing device.

According to a second aspect, the present invention provides a server apparatus, including: a communication device capable of communicating with a plurality of information processing apparatuses and a plurality of image forming apparatuses through a network; a log-in management device, receiving, from another apparatus, a log-in request of a user together with apparatus information specifying the another apparatus through the communication device and thereby authenticating the user, configured to manage logged-in user together with the apparatus information; a data management device configured to manage data uploaded by the user from another information processing apparatus in association with the user; and a transmitting device configured to transmit data designated by the logged-in user among the data managed by the data management device, to a designated image forming apparatus for printing. The log-in management device includes an authentication device, receiving, from another apparatus, a log-in request of a user together with apparatus information specifying the another apparatus through the communication device and thereby authenticating the user, a user log-in storage device configured to store the user authenticated by the authentication device together with the apparatus information, and a determining device, responsive to authentication of a user log-in by the authentication device, configured to determine whether it is stored in the log-in user storage device that the same user has logged in with another apparatus. The server apparatus further includes a default transmission destination setting device, responsive to a determination by the determining device that the same user is logged in for a plurality of apparatuses, configured to set an apparatus having a printing function as a default transmission destination for the transmitting device transmitting data to an image forming apparatus in accordance with a designation by the user.

In the server apparatus, it is possible by the data management device to determine whether a certain user is logged in to the server apparatus with a plurality of apparatuses. When the data designated by the user is to be transmitted by the transmitting device to the designated image forming apparatus, the apparatus having the printing function is set as a default transmission destination, by the default transmission destination setting device. When the data is to be printed, even if the request is not from the image forming apparatus but from an apparatus other than the image forming apparatus, the data can be transmitted to and printed by the image forming apparatus that is logged-in simultaneously. As a result, when the user having data held in the server apparatus wishes to have the data printed, it is unnecessary to operate the image forming apparatus. Thus, even a user not familiar with the operation of image forming apparatus can easily obtain the print-out of the desired document.

Preferably, the server apparatus further includes a data operation device responsive to an operation instruction of a data managed by the data management device from a user logged-in to the server apparatus through the communication device, configured to execute the operation designated by the user on the data.

The server apparatus may further include a device responsive to reception of a log-out request from the information processing apparatus, for a user who is determined by the determining device to be stored in the user log-in storage device as a user logged-in to the information processing apparatus both through the image forming apparatus and the information processing apparatus simultaneously, configured to the user stored in the log-in user storage device all logged-out.

The server apparatus may further include: a receiving device configured to receive an operation by the user logged-in to the server apparatus for selecting any of the data managed by the data management device; a first determining device, responsive to authentication of user log-in by the authentication device, configured to determine whether or not the data selected by the user through the receiving device exists; and a second determining device, responsive to authentication of the user log-in by the authentication device, configured to determine whether or not a default transmission destination is set by the default transmission destination setting device for the user. The transmitting device includes a device, responsive to positive determinations by both the first and second determining device, configured to generate print data from the data selected by the logged-in user through the receiving device from among the data managed by the data management device, and transmitting the print data for printing to the default transmission destination.

If the user logs in beforehand to the server apparatus through an apparatus other than the image forming apparatus, for example, through a portable terminal, and selects data, the selection is received by the receiving device. When the user further transmits log-in information from the portable terminal to the image forming apparatus by proximity communication, the same user can log in from the image forming apparatus to the server apparatus. Then, the default transmission destination for the user is set to be this image forming apparatus. At this time, the determinations by the first and second determining device become both positive and, by the device for transmitting, the print data is generated from the selected data, and transmitted to the default transmission destination (logged-in image forming apparatus).

When the user selects the data of server apparatus beforehand using his/her portable terminal, the print data can automatically be generated from the pre-selected data and transmitted and printed by the image forming apparatus, when communication is established between the portable terminal and the image forming apparatus through proximity communication. The time for the user to operate the image forming apparatus becomes shorter, and for the user, the time and trouble of operating the image forming apparatus can be saved. It becomes possible for the image forming apparatus to provide services to larger number of users in a short period of time.

According to a third aspect, the present invention provides an information processing apparatus, including: a user interaction device, configured to receive a user instruction through an interaction with the user and to display information corresponding to the instruction; first communication device configured to communicate with another apparatus through a network; a second communication device configured to communicate with another apparatus through proximity communication; log-in executing device, using information input through the user interaction device, for executing a log-in process of a user to a designated service through the first communication device; and a log-in information transmitting device, after log-in to the designated service is permitted by the log-in executing device and communication with another apparatus through the second communication device becomes possible, configured to transmit access information to a service to which log-in is executed by the log-in executing device and log-in information necessary for log-in to the service, to the another apparatus made communicable through the second communication device.

When a plurality of apparatuses are to log-in to one same service, the information processing apparatus logs in first, using the first communication device. By placing the information processing apparatus close to another apparatus that is communicable with the second communication device, the information to have the another apparatus log-in to the already logged-in service can be transmitted. As a result, the another apparatus can log-in to the same service easily, without necessitating the user to enter the log-in information.

Preferably, the information processing apparatus is a portable information terminal.

Advantageous Effects of Invention

As described above, by the present invention, when the image forming apparatus is to log-in to the cloud service, not the image forming apparatus but a portable information terminal is logged in to the cloud service. Thereafter, by moving the portable information terminal close to the proximity communication device, the log-in information for log-in to the cloud service is transmitted to the image forming apparatus, enabling log-in of the image forming apparatus to the cloud service. The image forming apparatus can log-in to the cloud service not through the use of the image forming apparatus. Therefore, even a user not familiar with the operation of image forming apparatus can easily have the image forming apparatus logged-in to the cloud service, using his/her own portable information terminal. By using such a scheme, it is possible to select one from a plurality of cloud services and to have the image forming apparatus logged-in easily to the selected service.

As a result, an image forming apparatus, a server apparatus and an information processing apparatus allowing easy log-in to a desired cloud service can be provided.

BRIEF DESCRIPTION OF DRAWINGS

FIG. 7 is a time chart diagram related to communication performed between each of the components and processes carried out by each of the components forming the cloud image output service shown in FIG. 5.

FIG. 18 shows a screen for selecting a print job as the object of output, after log-in to the cloud image output service using the portable terminal.

FIG. 19 schematically shows a screen of a re-log-in screen displayed on the portable terminal or the operation panel of image forming apparatus, when log-in to the cloud image output service fails.

DESCRIPTION OF EMBODIMENTS

Figure 1:
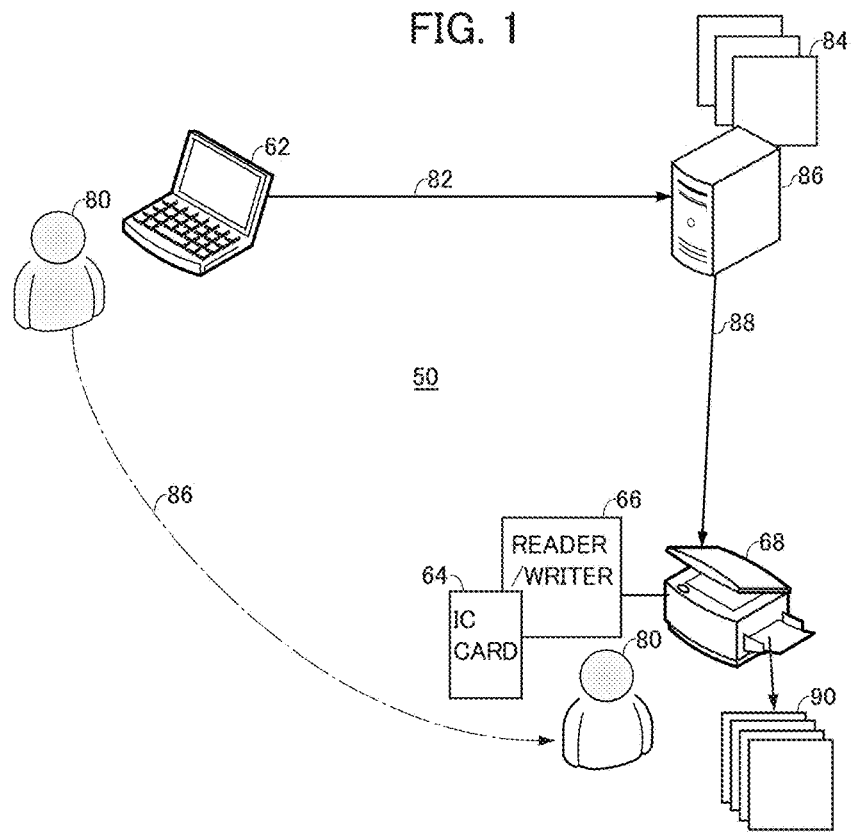
FIG. 1 is a schematic diagram showing a simplified configuration of a conventional image output system using cloud service (hereinafter referred to as "cloud image output service").
Figure 3:
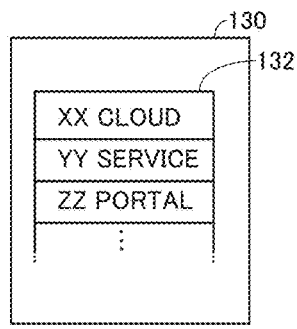
FIG. 3 is a schematic diagram showing a list of available services, displayed on an operation panel of the image forming apparatus at the time of log-in to the conventional cloud image output service.
Figure 4:
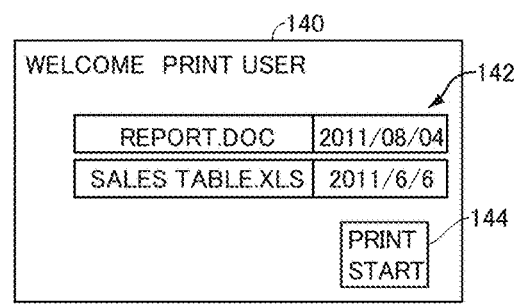
FIG. 4 shows an example of a screen displayed at the time of log-in to a target service, of the conventional cloud image output service.
Figure 2:
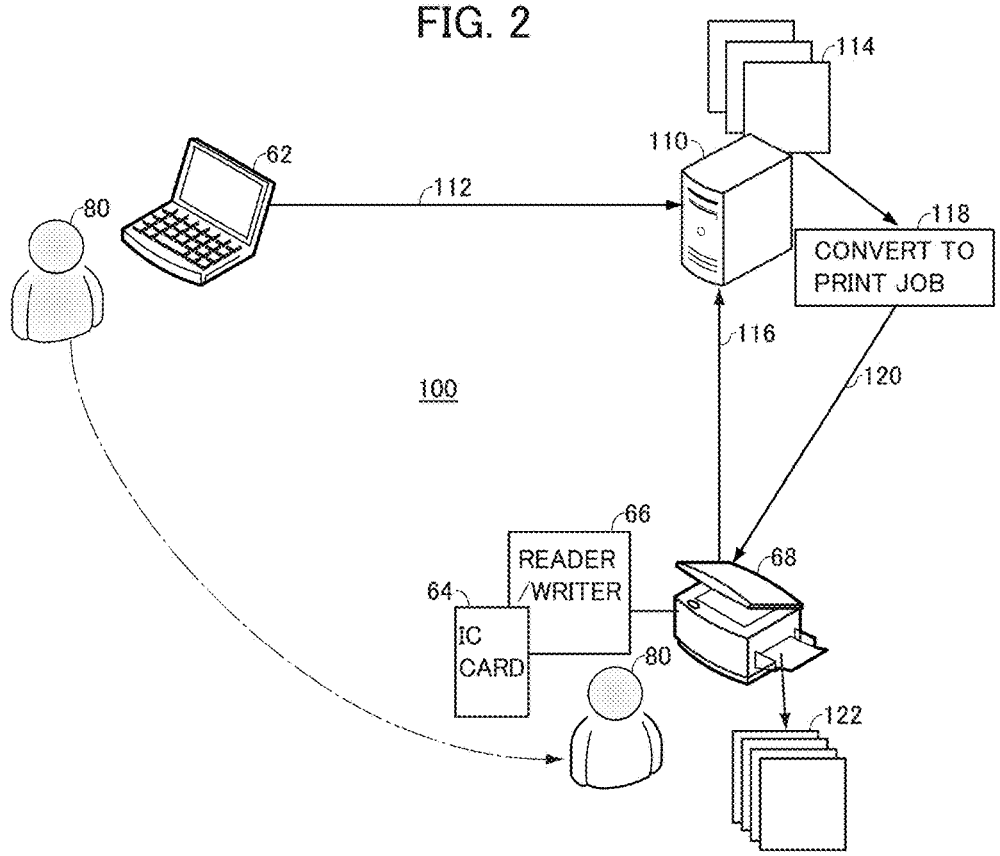
FIG. 2 is a schematic diagram showing a simplified configuration of another example of conventional cloud image output service.

In the following description and in the drawings, the same components are denoted by the same reference characters. Therefore, detailed description thereof will not be repeated.

First Embodiment

[Outline]

Figure 6:
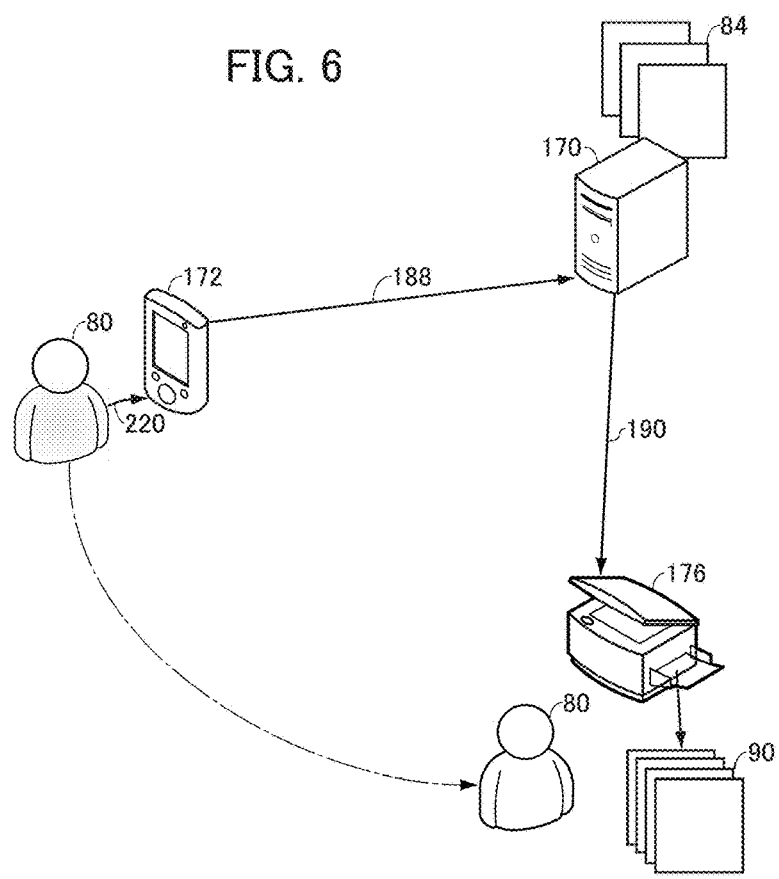
FIG. 6 is a schematic diagram illustrating an operation of a user when an image is to be output, in the cloud image output service shown in FIG. 5.

Referring to FIG. 6, a cloud image output system 160 in accordance with the first embodiment of the present invention includes a cloud server 170, which saves print job 84 generated by a user 80 and, when an output request is received, transmits a designated print job to an MFP. It is assumed that to the system, an information processing apparatus 160, typically a portable terminal 172 represented by a so-called smart phone, an MFP 176 and the like are connectable. In the present embodiment, a reader/writer 174 capable of proximity connection with portable terminal 172 is connected to MFP 176.

First, the outline of cloud image output system 160 will be described.

Figure 5:
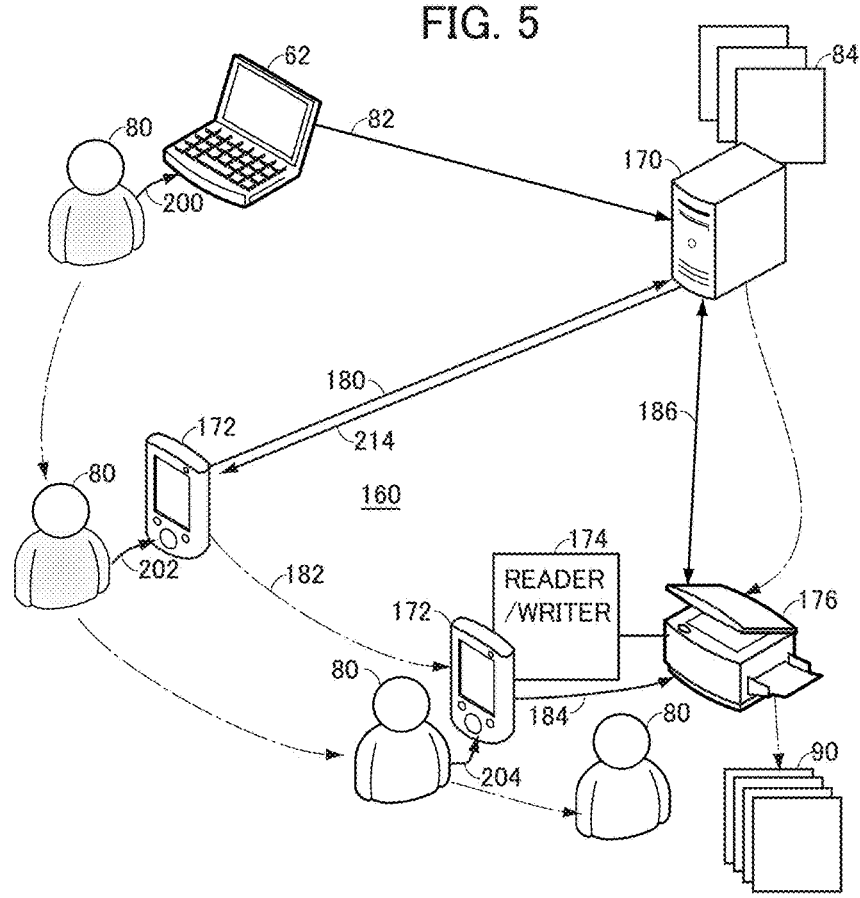
FIG. 5 is a schematic diagram showing a simplified configuration of cloud image output service in accordance with a first embodiment of the present invention.

Referring to FIG. 5, user 80 executes a print operation 200 to information processing apparatus 62, and transmits a print job 82 of a document file to cloud server 170. Cloud server 170 saves the transmitted print job 82 as a print job 84. User 80 further operates MFP 176 and prints print job saved in cloud server 170. Here, the user follows the procedure such as described below.

First, user 80 executes a log-in operation 202 to portable terminal 172, and transmits a log-in request 180 to cloud server 170. At this time, a log-in permission 214 is transmitted from cloud server 170 to portable terminal 172. User 80 further moves 182 portable terminal 172 to the position of MFP 176, and waves portable terminal 172 over reader/writer 174. By this operation 204, user 80 can log-in to MFP 176. At this time, portable terminal 172 transmits the URL (Universal Resource Locator) of cloud server 170 and log-in information 184 including user information and password for log-in, to MFP 176. Using the log-in information 184, MFP 176 communicates with cloud server 170 designated by the URL in log-in information 184 and executes the log-in process 186, and using the given user information and password, logs in to cloud server 170. Therefore, it is possible for user 80 to have MFP 176 logged-in to cloud server 170 using not the browser screen of MFP 176 but using portable terminal 172.

Once user 80 can log-in to MFP 176, user 80 can operate MFP 176 to down-load the desired print job 84 to MFP 176 and obtain a print-out 90, in the similar manner as in the system shown in FIG. 1.

Further, in the present embodiment, as shown in FIG. 6, after log-in to the cloud server 170 by portable terminal 172 and MFP 176, the user 80 can transmit a print instruction 188 to cloud server 170 by an operation 220 of portable terminal 172, rather than MFP 176. When print instruction 188 is received from portable terminal 172, cloud server 170 transmits the print job 84 designated by the print instruction 188 as a print job 190 to the MFP (in the example of FIG. 6, MFP 176) that is logged in simultaneously for the same user as portable terminal 172. Receiving print job 190, MFP 176 outputs it as a print-out 90. Therefore, it is possible for user 80 to obtain print-out 90 output from MFP 176 simply by operating portable terminal 172.

The operation sequence described above is shown in FIG. 7. Referring to FIG. 7, first, user 80 performs a document printing operation 200 using information processing apparatus 62. Information processing apparatus 62 generates print job 82 and transmits it to cloud server 170. Cloud server 170 performs a process 210 for saving the print job.

Thereafter, the user performs a log-in operation 202 using portable terminal 172, so that portable terminal transmits log-in request 180 to cloud server 170. In response to log-in request 180, cloud server 172 performs an authentication process 212, and if authentication is successful, it transmits a log-in permission 214 related to user 80 to portable terminal 172.

Further, when user 80 performs an operation 204 of waving portable terminal 172 over reader/writer 174 of MFP 176, user 80 can log-in to MFP 176. At this time, log-in information 184 necessary to have MFP 176 logged-in to cloud server 170 is transmitted from portable terminal 172 to MFP 176.

Receiving the log-in information 184, MFP 176 communicates with cloud server 170 and executes the log-in process 186, using log-in information 184.

Once MFP 176 logs in to cloud server 170, it becomes possible to use cloud server 170 from MFP 176 as described above. In addition, if user 80 performs the print process 222 using portable terminal 172, print instruction 188 corresponding to the designated print job 84 is transmitted to cloud server 170. Cloud server 170 transmits the designated print job 84 as print job 190 to MFP 176, and MFP 176 prints the print job and outputs a print-out 90.

Though an example using MFP 176 is described in the present embodiment, any image output apparatus such as a printer, a printer with scanning function and a multifunctional peripheral may be used in place of MFP 176.

[Configuration]

(Network)

Figure 8:
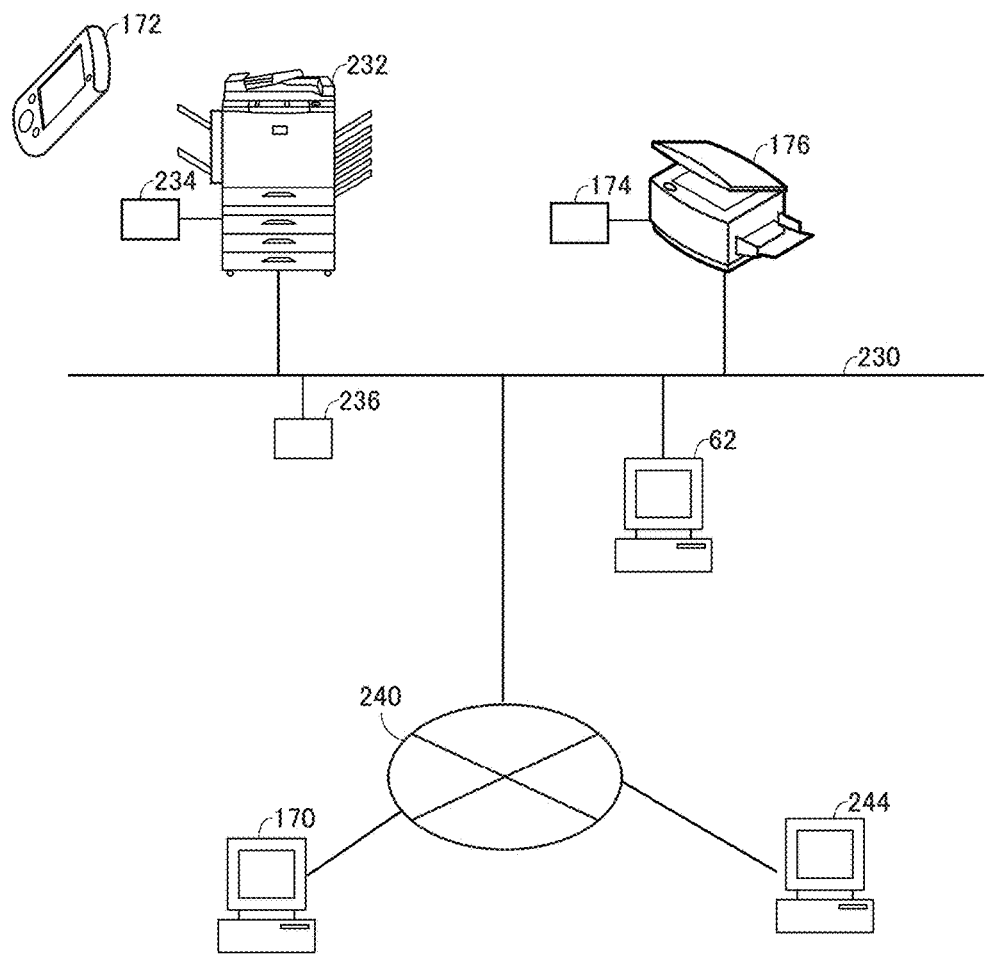
FIG. 8 is a block diagram showing an example of a configuration of cloud image output service shown in FIG. 5.

Referring to FIG. 8, in the present embodiment, each of the components forming cloud image output system 160 is connected to the Internet 240. Specifically, cloud image output system 160 includes: cloud server 170 and other cloud server 220 both connected to the Internet 240; a network 230 connected to the Internet 240; information processing apparatus 62, MFP 176 and MFP 232 connected to network 230; reader/writer 174 connected to MFP 176; a reader/writer 234 connected to MFP 232; a wireless router 236 connected to network 230; and portable terminal 172. Portable terminal 172 is communicable with reader/writer 174, reader/writer 234, and wireless router 236. It is noted that portable terminal 172 is connected through wireless router 236 to network 230 and capable of communication with network 230 and facilities on the Internet 240. Further, MFPs basically have the same configurations and the cloud servers also basically have the same configurations. Therefore, in the following, MFP 176 will be described as a representative of the MFPs, and cloud server 170 will be described as a representative of the cloud servers. Network 230 may be an IP network such as intranet/internet, including LAN (Local Area Network), wireless LAN, WiMAX, PLC, and c.link.

(Cloud Server 170)

Figure 9:
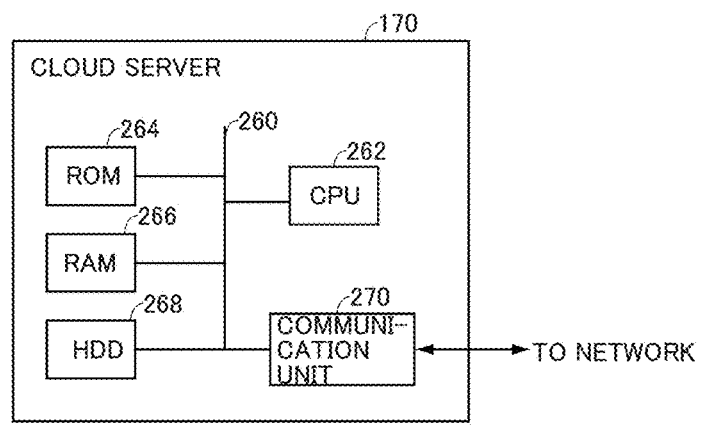
FIG. 9 is a hardware block diagram of a cloud server providing the cloud image output service.

Referring to FIG. 9, cloud server 170 includes a bus 260, and a CPU (Central Processing Unit) 262, an ROM (Read Only Memory) 264, an RAM (Random Access Memory) 266 and an HDD (Hard Disk Drive) 268, all connected to bus 260, and a communication unit 270 connected to bus 260 and the network.

Figure 10:
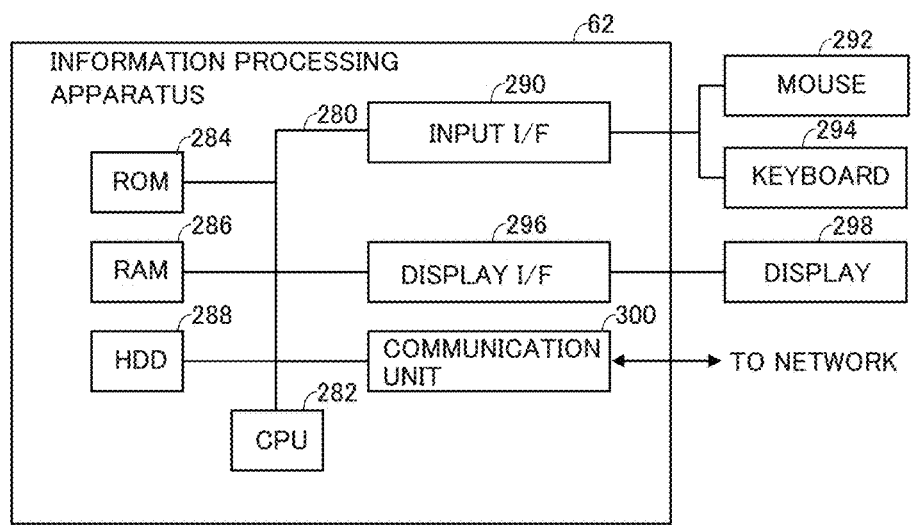
FIG. 10 is a hardware block diagram of an information processing apparatus of a user using the cloud image output service.

Referring to FIG. 10, information processing apparatus 62 includes a bus 280, a CPU 282, an ROM 284, an RAM 286, an HDD 288, an input/output interface 290 and a display interface 296, all connected to bus 280, and communication unit 300 connected to bus 280 and to the network. To input/output interface 290, a mouse 292 and a keyboard 294 are connected and to display interface 296, a display 298 is connected.

Figure 11:
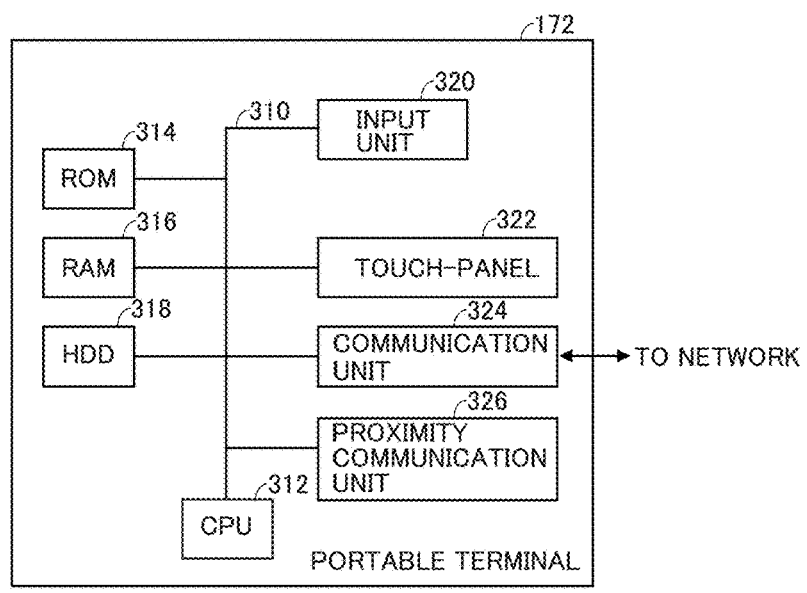
FIG. 11 is a hardware block diagram of a portable terminal of a user using the cloud image output service.

Referring to FIG. 11, portable terminal 172 includes a bus 310, a CPU 312, an ROM 314, an RAM 316, an HDD 318, an input unit 320 including buttons for input, and a touch-panel 322 all connected to bus 310, a wireless communication unit 324 connected to bus 310, and a proximity communication unit 326 connected to bus 310 and communicates with reader/writer 174 or the like through wireless proximity communication. Input unit 320 and touch-panel 322 are for receiving user instruction or data input through interaction with the user, or for displaying data requested by the user or information to be presented to the user.

Figures 12, 21:
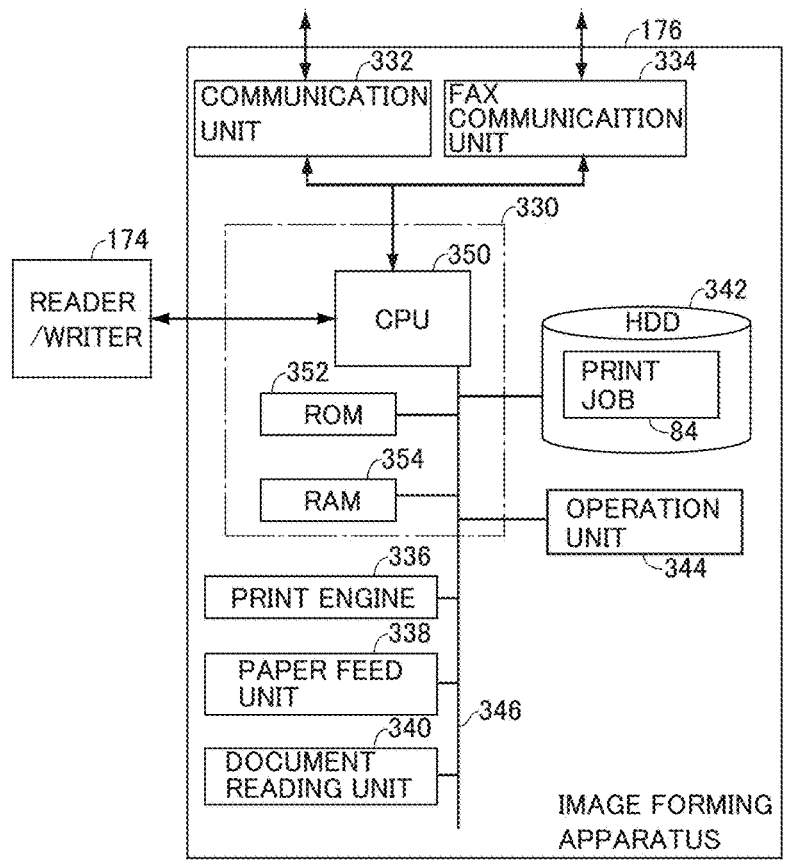
FIG. 12 is a hardware block diagram of a multifunctional peripheral (MFP) as an image forming apparatus forming the cloud image output service.
FIG. 21 is a flowchart representing a logical control structure of a first portion of a program executed when the cloud server receives a log-in request from another apparatus.

Referring to FIG. 12, MFP 176 includes a control unit 330 for overall control of MFP 176, a communication unit 332 connected to control unit 330 for communication through the network, a FAX communication unit 334, connected to control unit 330 for facsimile communication with other MFP and the like through public telephone network, a bus 346 connected to control unit 330, an HDD 342 connected to control unit 330, for storing print job 84 and the like, and an operation unit 344, connected to control unit 330, including a touch-panel and a small number of hardware buttons. Reader/writer 174 described above is connected to control unit 330 through an interface, not shown.

MFP 176 further includes a print engine 336 connected to control unit 330 through bus 346 and forming an image on a prescribed recording medium (typically, printing paper) under the control of control unit 330, a paper feed unit 338 feeding printing paper to bus 346 under the control of control unit 330, and a document reading unit 340 for reading a black-and-white or color document image and storing it in HDD 342 in accordance with the control of control unit 330.

Control unit 330 includes a CPU 350, an ROM 352, and an RAM 354, all connected to bus 346. HDD 342 and operation unit 344 are both communicable with control unit 330, ROM 352 and RAM 354 through bus 346.

[Software Configuration]

In the following, structures of the computer programs executed by the CPUs of each of the components forming the system described above will be described, focusing on the portions related to the present invention.

(Log-in of MFP to Cloud Server 170)

One of the differences over the conventional art is the process of MFP 176 to log-in to cloud server 170, realized by waving portable terminal 172, which has already been logged in to cloud server 170, over reader/writer 174 of MFP 176. In the following, the program structure executed by portable terminal 172 and MFP 176 to realize such a process will be described, referring to the mutual relations. In the following, it is assumed that portable terminal 172 has already logged in to cloud server 170 and that log-in information transmitted from cloud server 170 upon log-in is saved in portable terminal 172. As to the scheme for portable terminal 172 to log-in to cloud server 170, one similar to the conventional scheme may be used.

Figure 13:
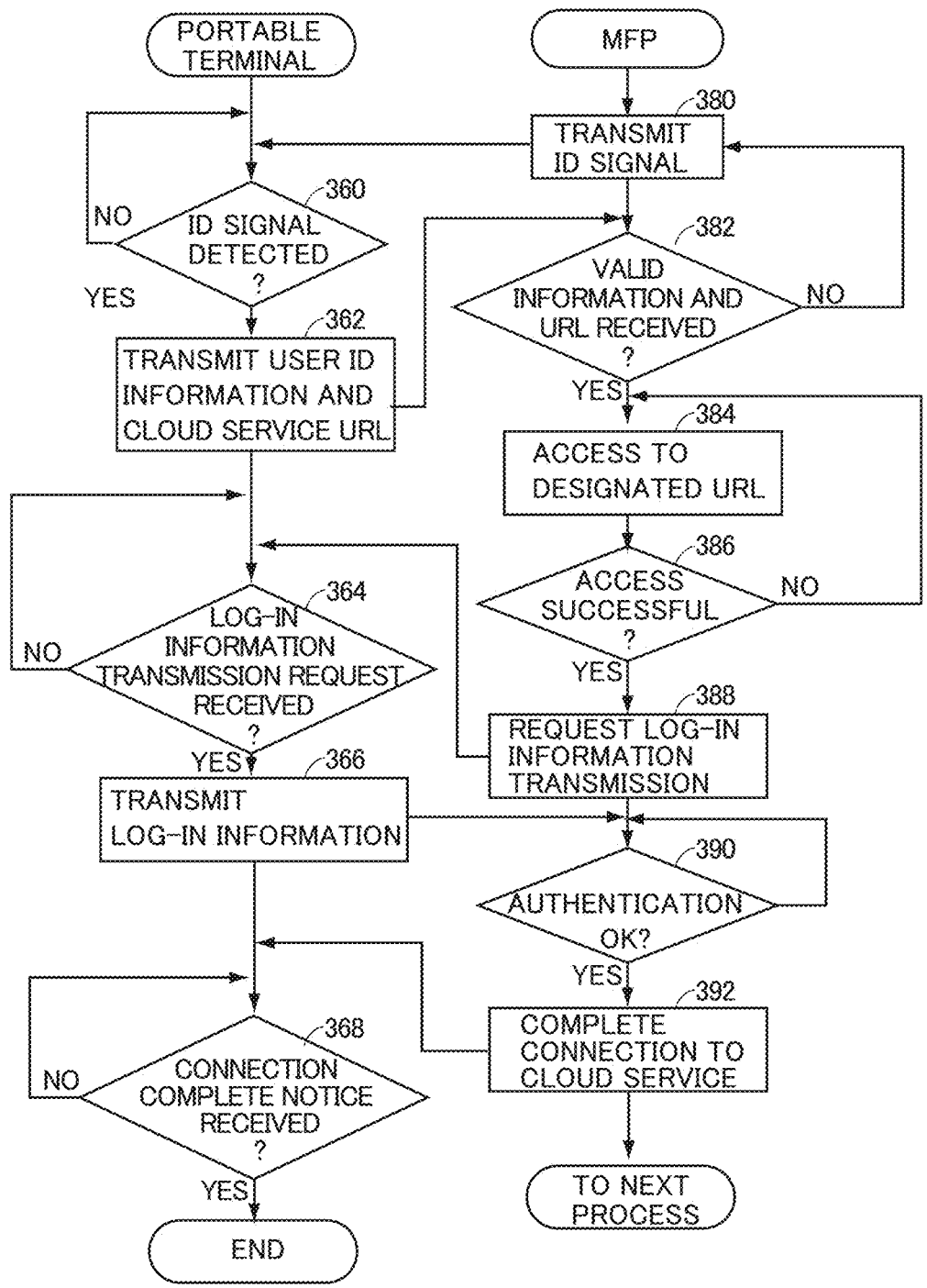
FIG. 13 is a flowchart representing a control structure of a program executed by the portable terminal and the MFP when log-in from the MFP to the cloud image output service is done using the portable terminal.

As represented by a step 380 on the right side of FIG. 13, reader/writer 174 constantly outputs an identification signal using weak electromagnetic wave, in order to notify the presence of itself to a card or an apparatus capable of proximity communication nearby. Referring to FIG. 13, the program executed by the portable terminal includes: a step 360, started when portable terminal 172 logs in to the cloud service, for waiting until the identification signal from MFP 176 is received; and a step 362 of transmitting, when the identification signal is detected, identification information for portable terminal 172 to log-in to IC card 64, and the URL enabling portable terminal 172 to use the already logged-in cloud service, through reader/writer 174 to MFP 176. MFP 176 is always waiting for the identification information and the URL (step 382), and when effective identification information and URL are received, authenticates log-in of portable terminal 172 to MFP 176 and accesses the transmitted URL (step 384). If the access succeeds (YES at step 386), MFP 176 transmits a request for transmitting the log-in information to the cloud server of the URL to portable terminal 172 (step 388).

On the other hand, portable terminal 172 is waiting for reception of the log-in information transmission request (step 364), and when it is received, it transmits the log-in information for the cloud server (user name and password) to MFP 176 (step 366).

Receiving the log-in information, MFP 176 tries to log-in to the designated cloud server using the user information, and waits for the end of authentication (step 390). When the log-in is authenticated (YES at step 390), a notice indicating successful connection completion to the cloud service is transmitted to portable terminal 172, connected state to the cloud service is recorded, and the process ends.

After transmitting the log-in information, portable terminal 172 waits until the connection completion notice is received from MFP 176 (step 368), and when the connection completion notice is received, the process ends.

Figure 14:
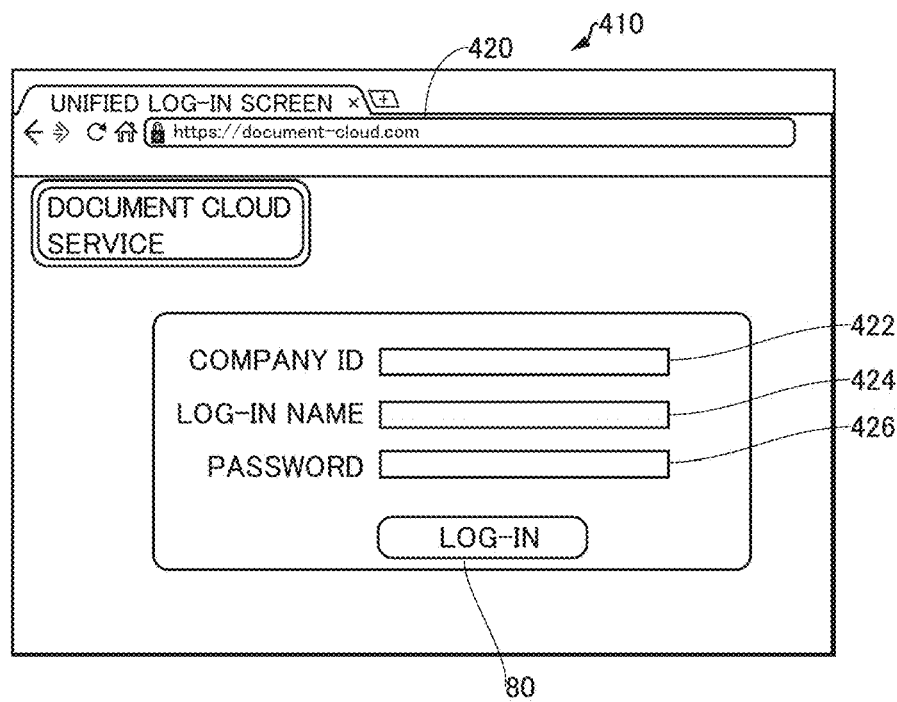
FIG. 14 shows an example of a log-in page displayed on the portable terminal at the time of log-in from the portable terminal to the cloud image output service.

FIG. 14 shows an example of the log-in screen when portable terminal 172 logs in to cloud server 170. Referring to FIG. 14, screen 410 includes a URL input field 420, a company ID field 422, a log-in name field 424, a password field 426, and a log-in button 430. Screen 410 is displayed, for example, when portable terminal 172 accesses cloud server 170, using the information transmitted from cloud server 170 to portable terminal 172.

In URL input field 420, the URL of cloud server 170 is displayed. To company ID field 422, identification information for the company to which the user using the cloud service belongs is input. To log-in name field 424, the user name is input. The company identification information and the user name are combined to form user identification information for identifying the user. By inputting necessary information to company ID field 422, log-in name field 424 and password field 426 and clicking or tapping log-in button 430, portable terminal 172 can log-in to cloud server 170.

Figure 15:
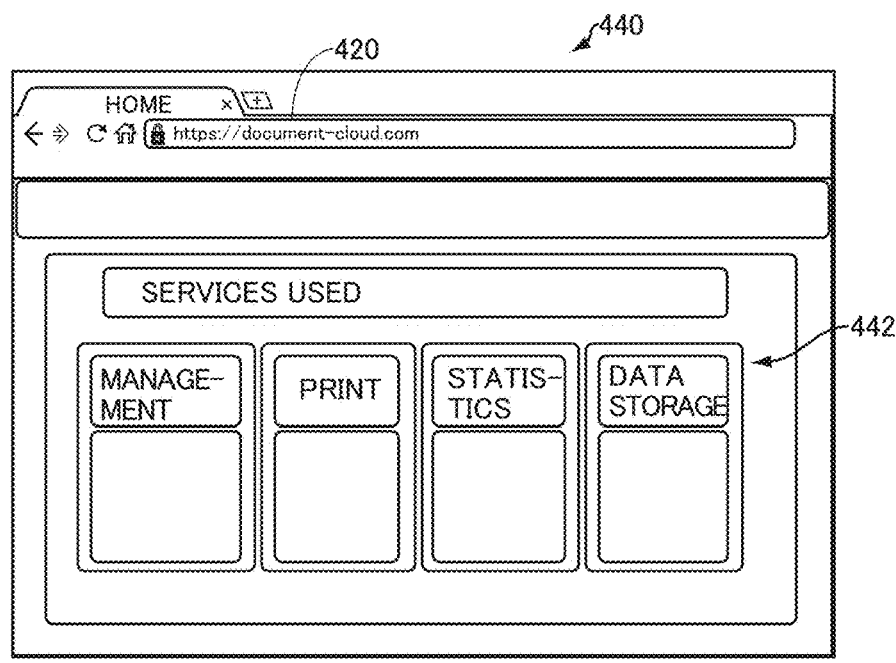
FIG. 15 shows an initial screen (home) displayed at the time of log-in from the log-in page shown in FIG. 14 to the cloud image output service.

Referring to FIG. 15, home screen 440 immediately after the user logged in to the cloud service includes URL input field 420 similar to that shown in FIG. 14 and a list 442 of services available to the user. The services of the list are provided as buttons and when a desired button is pressed, a main screen for the service is displayed.

Figure 16:
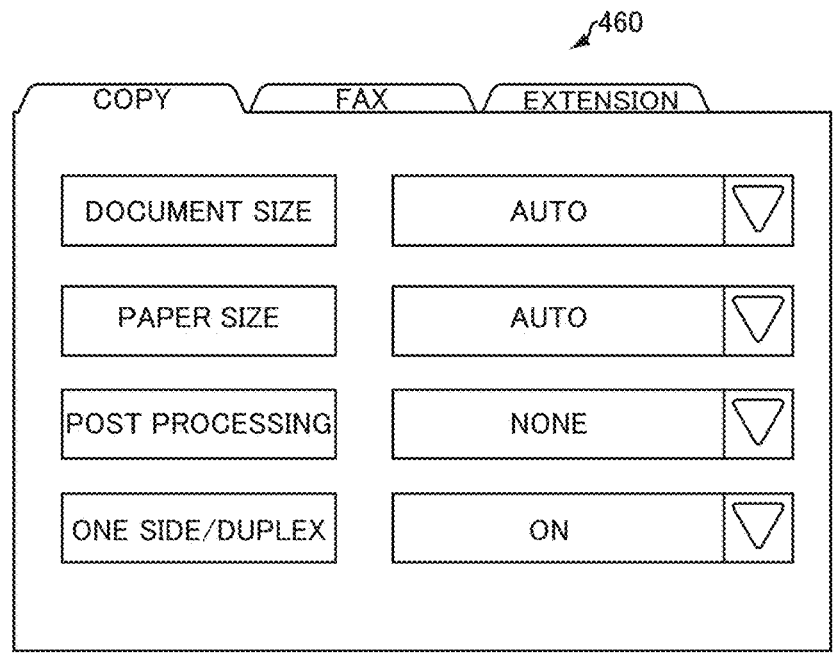
FIG. 16 shows a home screen displayed on the operation panel of MFP when the MFP is activated.

Referring to FIG. 16, on the operation panel of MFP 176 (not shown), generally, a home screen 460 of MFP 176 is displayed. Using home screen 460, copy, fax, document scanning and other processes can be executed.

Figure 17:
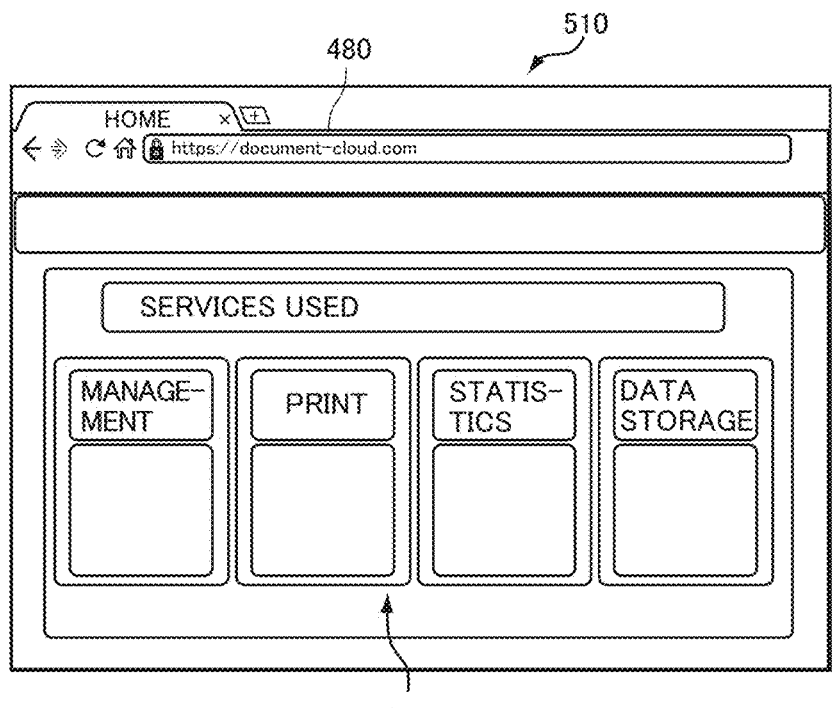
FIG. 17 shows a screen displayed on the operation panel of MFP at the time of log-in from the MFP to the cloud image output service using the portable terminal.

FIG. 17 shows an example of a screen displayed on operation panel of MFP 176 immediately after portable terminal 172 logs in to MFP 176 and by this operation MFP 176 logs in to cloud server 170. Referring to FIG. 17, the screen 470 is the same as that displayed on portable terminal 172 shown in FIG. 15. Namely, it is possible for the user to use the desired service of the cloud service both through portable terminal 172 and through MFP 176.

FIG. 18 shows an example of a print job selection screen 500 displayed on portable terminal 172 or MFP 176 when "PRINT" menu is selected on the screen shown in FIG. 15 or 17. As shown in FIG. 18, print jobs uploaded to cloud server 170 by the user are displayed as a list. When the user selects a desired print job from the list, the print job is transmitted to MFP 176 and printed by MFP 176.

In the present embodiment, when log-in from portable terminal 172 to cloud server 170 is successful, the log-in information at that time is transmitted to MFP 176. MFP 176 logs in to cloud server 170 using the log-in information. Therefore, when MFP 176 logs in to the cloud server, generally, log-in failure does not occur. There is still a possibility, however, that the log-in information received by MFP 176 involves an error or the information transmitted to cloud server 170 involves an error, for some causes. In such a situation, a re-try screen 510 of user authentication shown in FIG. 19 is displayed on operation panel of MFP 176, to ask input of user information again. It is very rare that screen 510 is displayed, and hence, the operation necessary for the user to log-in to the cloud service through MFP 176 is expected to be very simple as compared with the conventional approach.

(User and Device Log-in Management Program by the MFP)

Figure 20:
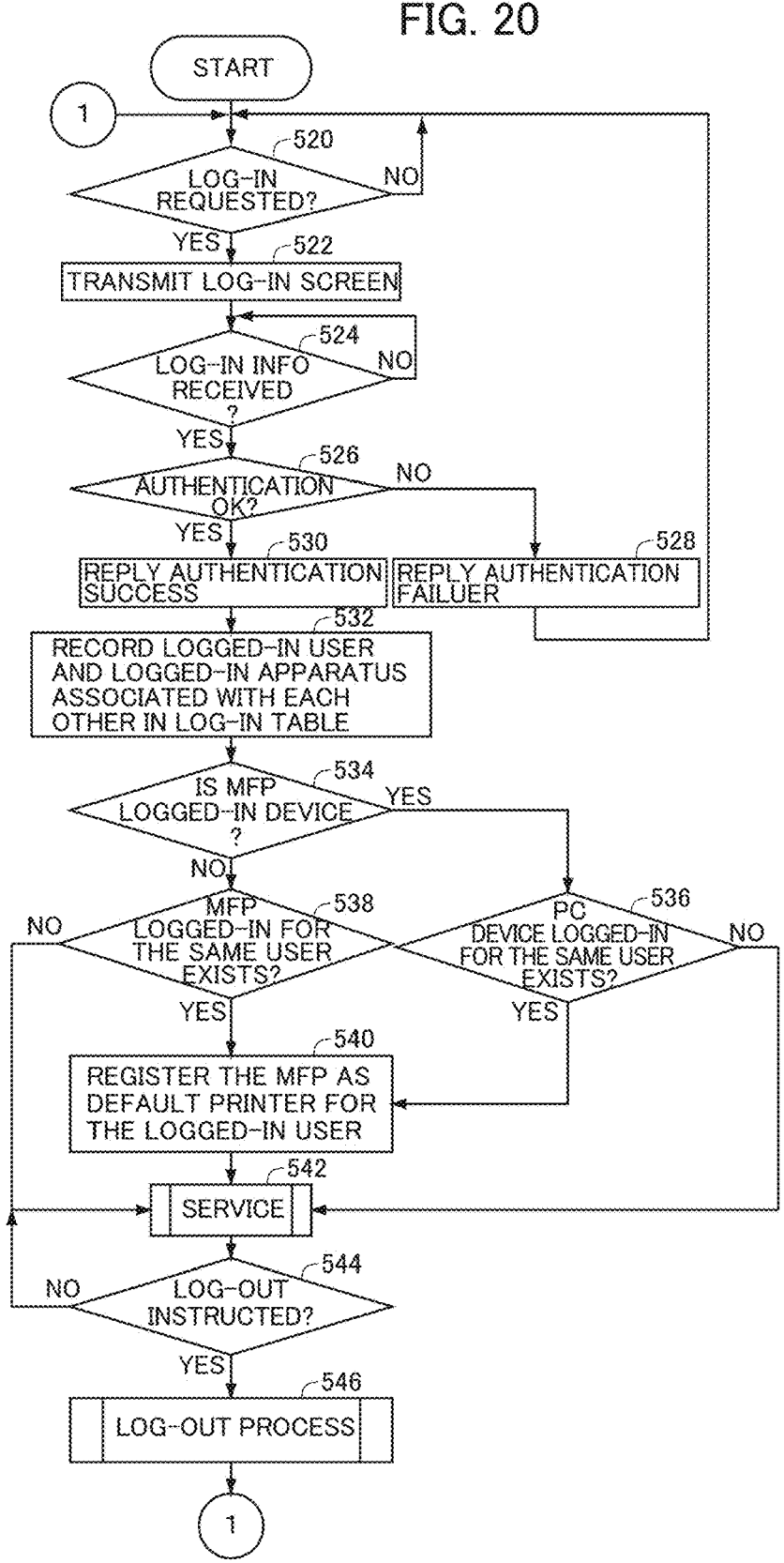
FIG. 20 schematically shows a configuration of a log-in table maintained by a cloud server of the cloud image output service.

The program for managing log-in of a user and a device used by the user, executed by cloud server 170 has the following control structure. Referring to FIG. 20, cloud server 170 waits for reception of a log-in request (step 520). When a log-in request is received, cloud server 170 transmits a log-in screen (screen 410 shown in FIG. 14) to the terminal that has transmitted the request (step 522), and waits until the log-in information is received (step 524). When the log-in information is received, cloud server 170 uses the received log-in information and compares the user information it manages with the log-in information, to authenticate the user (step 526). If the authentication fails, a reply of failed authentication is sent to the counterpart terminal (step 528), and the control returns to step 520. At step 528, as the screen of failed authentication, a screen such as shown in FIG. 19 is transmitted to the counterpart terminal.

On the other hand, if authentication is successful at step 526, cloud server 170 transmits a reply of successful authentication to the counterpart terminal (step 530). Then, the logged-in user and the logged-in device are recorded in association with each other, in a log-in table (step 532).

Here, the log-in table represents a table maintained by cloud server 170 for managing the logged-in users and logged-in devices. Referring to FIG. 21, log-in table 560 includes a company name and the user name of the logged-in user, the type of device used for log-in, and the type information of the logged-in device. As can be seen from FIG. 21, in the present embodiment, it is possible for the user to log-in through a plurality of devices. The type of logged-in device can be determined by the information transmitted from the browser. The logged-in device information is, in the present embodiment, an IP address allocated to the logged-in device.

Again referring to FIG. 20, after step 532, cloud server 170 determines whether the logged-in device is an MFP. Here, substantially, whether the logged-in device is an MFP, a personal computer (hereinafter denoted as "PC") or a portable terminal is determined. In the following, the PC and the portable terminal will be collectively referred to as "PC device." If the logged-in device is an MFP, at step 536, whether or not there is any PC device logged-in by the same user is determined. If there is such a PC device, the process proceeds to step 540, and the MFP is registered as a default printer for the same user logged-in for the PC device, with the user management information of cloud server 170. Thereafter, the cloud service is provided to the user (step 542). When a log-out instruction is received (step 544), a log-out process (step 546) is executed for the user, and the control returns to step 520. When it is determined at step 536 that no PC device is logged in for the same user, the process of step 540 is omitted and the process of step 542 starts.

On the other hand, if it is determined at step 534 that the logged-in device is not an MFP, at step 538, whether or not an MFP has been logged in for the same user is determined, by looking up a log-in table 560. If there is an MFP logged-in for the same user, at step 540, the MFP is registered as the default printer for the currently logged-in user, with the user management information, and the cloud service starts (step 542). The subsequent process is the same as described above. If it is determined at step 538 that no MFP is logged in for the same user, the process of step 540 is omitted and the cloud service starts immediately (step 542).

Service Execution Program

The program executed by cloud server 170 (service execution program) when any print job is designated and the print job is transmitted to a counterpart terminal to be printed, when any print job is to be transmitted to a designated destination (electronic mail, facsimile), or when a print job is to be deleted has such a control structure as described in the following.

Figure 22:
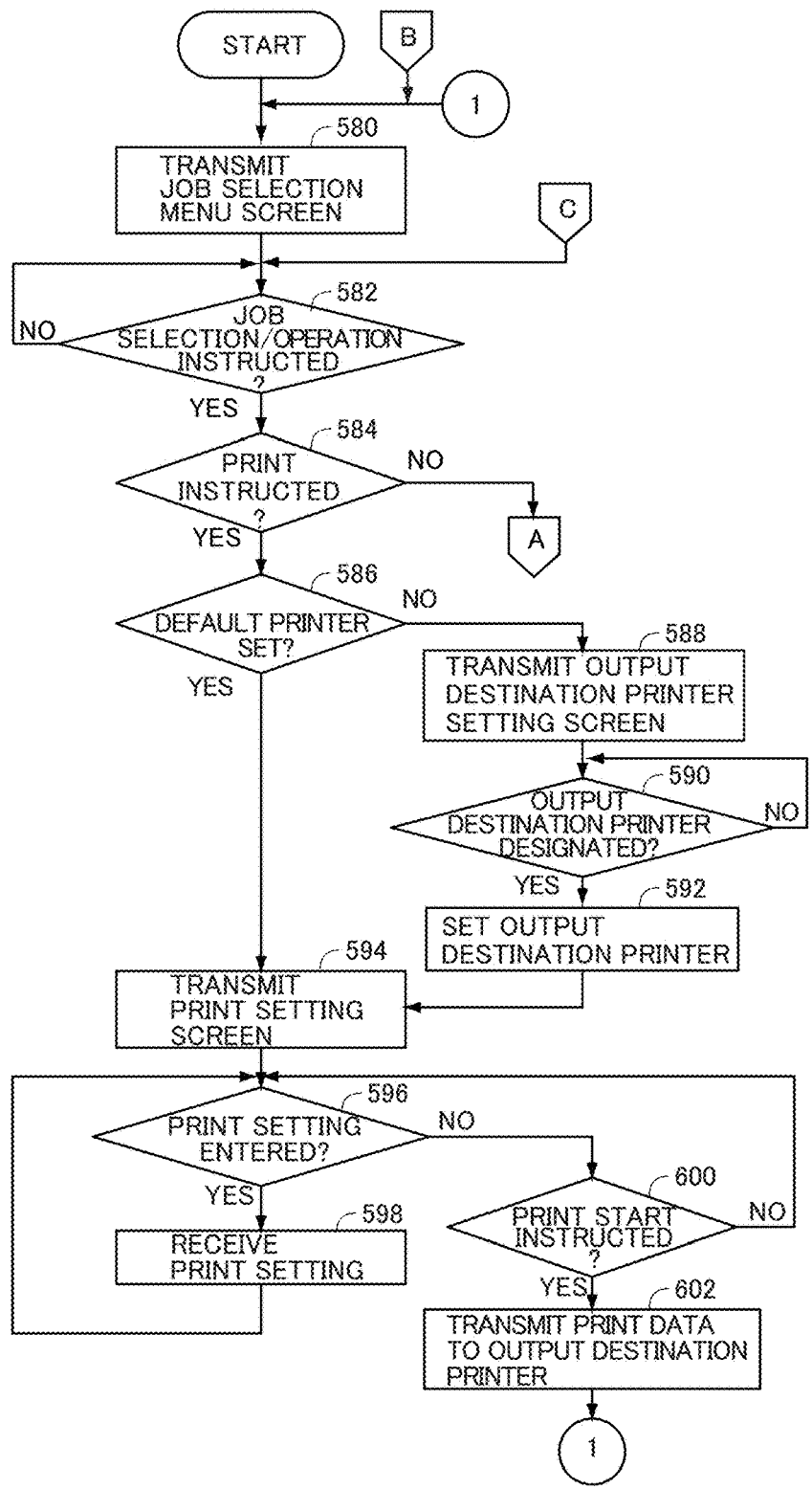
FIG. 22 is a flowchart representing a logical control structure of a second portion following the first portion of the program executed when the cloud server receives a log-in request from another apparatus.

Referring to FIG. 22, the program includes: a step 580 started upon reception of a print service request, of transmitting a job selection menu screen allowing selection of a print job; a step 582 of waiting for selection of a print job or a print job operation instruction from a terminal; a step 584 of determining, when any operation is received at step 582, of determining whether the operation is a print instruction of the print job or not; and a step 586 executed when the operation is the print instruction, of confirming whether a default printer is set for the user who sent the print instruction based on the user management information. If the default printer is set, a print setting screen is transmitted (step 594), and the control waits for any instruction (step 596 and 600). If any instruction is received and the contents represent input of print setting (YES at step 596), the input is received at step 598 and the print setting for the user is updated (step 598), and the flow again waits for any input. If the input is not the input of print setting, whether it is an instruction to start printing or not is determined (step 600). If it is not the instruction to start printing, the control returns to step 596. If it is the instruction to start printing (YES at step 600), the designated print job is transmitted to the default printer (step 602), and the control returns to step 580.

On the other hand, if it is determined at step 586 that the default printer is not set, at step 588, a screen for setting the output destination printer is transmitted to the counterpart terminal. The flow waits until the instruction for the output destination printer is received (step 590), and when the instruction is received, sets the output destination printer for the user as instructed (step 592). Thereafter, the control proceeds to step 594. The subsequent process is the same as when the default printer is set.

Figure 23:
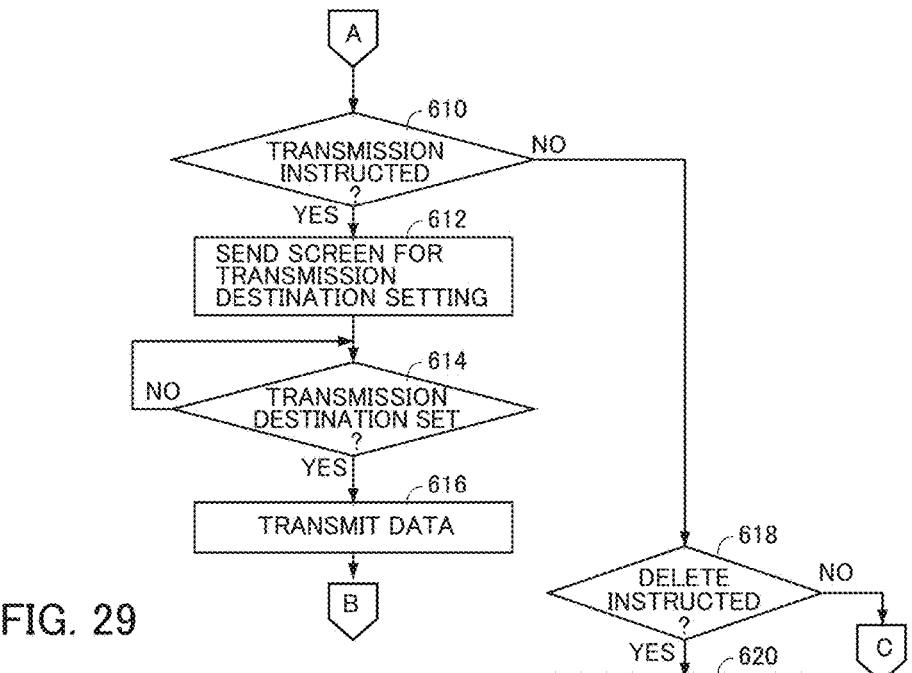
FIG. 23 is a flowchart representing a logical control structure of a third portion following the second portion of the program executed when the cloud server receives a log-in request from another apparatus.

If it is determined at step 584 of FIG. 22 that the received instruction is not a print instruction, the control proceeds to step 610 of FIG. 23. At step 610, whether the instruction is an instruction to transmit the print job to any transmission destination (transmission instruction) or not is determined. If the instruction is a transmission instruction, at step 612, a screen for setting the transmission destination is transmitted to the counterpart terminal. Then, the flow waits until an instruction setting the transmission destination is received (step 614), and when the instruction is received, the designated print job is transmitted to the designated transmission destination (step 616), and the control returns to step 580 of FIG. 22.

If the determination at step 610 is negative, the control proceeds to step 618. At step 618, whether the received instruction is for deleting the print job or not is determined. If the determination is positive, the designated job is deleted at step 620, and the control returns to step 580 of FIG. 22. If the determination at step 620 is negative, the control returns to step 582 of FIG. 22.

In FIG. 23, for convenience of description, only the transmission and deletion of print job have been described. Though the processes such as moving a print job to another folder are not shown in the figure, such processes can readily be realized by a person skilled in the art.

(Log-Out Process by MFP)

Figure 24:
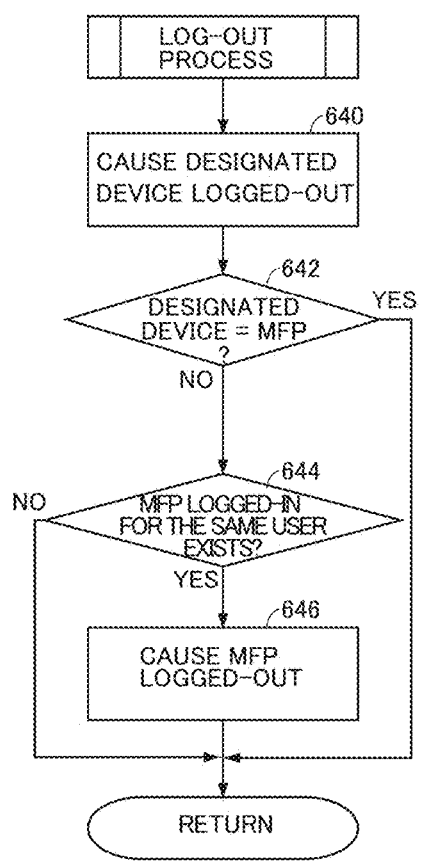
FIG. 24 is a flowchart representing a control structure of a program executed when the cloud server receives a log-out instruction.

The program for log-out executed at step 546 of FIG. 20 has such a control structure as described in the following. Referring to FIG. 24, the log-out process includes a step 640 of having the device, from which the log-out process has been transmitted, logged-out. At step 640, specifically, the device is deleted from the log-in table 560. Further, at step 642, whether the device that has transmitted the log-out instruction is an MFP or not is determined. If it is an MFP, no further step is executed and the process ends. If it is not an MFP, at step 644, whether or not there is an MFP logged-in for the same user is determined. If not, no further step is executed and the process ends. If there is an MFP, at step 646, the MFP is also logged-out simultaneously (deleted from log-in table 560), and the process ends.

[Operation]

Components of the cloud image output system 160 of which configurations have been described above operate in the following manner. In the following description, it is assumed that user 80 has already operated information processing apparatus 62 and uploaded print job 84 to cloud server 170.

(MFP Log-in Process)

Assume that user 80 has not yet logged in to MFP 176. User 80 first logs in to the service (cloud server 170) through a web browser (or a dedicated application for the service access), using his/her own portable terminal 172. Here, in cloud server 170, the process that proceeds through the steps 520, 522, 524, 526, 530, 532 and 534 shown in FIG. 20 is executed. The result of determination at step 534 is NO, and hence, the flow proceeds to steps 538 and 542. The operation by user 80 here is done by using his/her own portable terminal 172 to connect to the service he/she uses and, therefore, the operation is easy and not confusing for the user.

Next, user 80 moves portable terminal 172 closer to reader/writer 174 of MFP 176 by which printing is to be done, with portable terminal 172 being logged in to cloud server 170. At this time, referring to FIG. 13, in portable terminal 172 and MFP 176, the process proceeding through steps 380, 360, 362, 382, 384, 386, 388, 364 and 366 is executed. By this process, from portable terminal 172 to MFP 176, the service URL and the log-in information as the information to have MFP logged-in is transferred through reader/writer 174 to MFP 176. Using the received service URL and log-in information, the MFP selects the cloud service and logs in (steps 390 and 392 of FIG. 13). There-after, the process of step 368 of FIG. 13 is executed, and hence, in addition to portable terminal 172, MFP 176 logs in to cloud server 170 for the same user.

On the other hand, here, in cloud server 170, the process proceeding through the following path of the flowchart shown in FIG. 20 is executed. When the log-in request from MFP 176 is received (step 520), cloud server 170 executes the process steps 522, 524, 526, 530 and 532 and then the step 534. Here, the result of determination is YES, and the control proceeds to step 536. Here, the determination at step 536 is YES, and the control proceeds to step 540. At step 540, the MFP 176 that has sent the log-in request is registered as the default printer of the same user who has already logged in, and the flow proceeds to execution of the service (step 542). Thereafter, user 80 can execute the process such as printing, transmission or deletion, of any print job using portable terminal 172 and MFP 176.

Generally, the cloud service available from MFP 176 would be large in number, as described above. Therefore, according to the prior art, user 80 has to select a cloud service he/she uses from among a large number of cloud services. Further, such a selection requires use of an operation panel of MFP 176 seldom used by the user, and hence, the operation is troublesome. In contrast, by the present embodiment, the log-in operation is necessary only once, for portable terminal 172. It is possible for the user to access a routinely used service through a familiar portable terminal 172 and thereby to have MFP 176 logged-in to the service. Thus, user 80 can immediately use the unfamiliar MFP without any confusion.

(Use of Service)

Consider that after MFP 176 has logged in to the service, user 80 prints a print job saved in cloud server 170. User 80 selects "PRINT," from screen 440 shown in FIG. 15 displayed on portable terminal 172. In response, cloud server 170 executes step 580 of FIG. 22, so that a screen such as shown in FIG. 18 is displayed on portable terminal 172. When the user selects any of the print jobs therefrom and presses "PRINT" button, a print instruction for the job is transmitted from portable terminal 172 to cloud server 170. Receiving the print instruction, cloud server 170 executes the process of steps 584 and 586 shown in FIG. 22. Here, user 80 has already logged in through MFP 176 and, therefore, the determination at step 586 is positive, and at step 594, a screen for print setting is displayed. If user 80 conducts print setting here, cloud server 170 performs the process steps 596 to 598, and again waits for any instruction. When the user selects printing, cloud server 170 performs the process of step 596 (NO) and step 600 (YES) of FIG. 22, and the print data is transmitted to cloud server 170 at step 602.

As described above, user 80 can easily obtain a print-out using portable terminal 172, without any trouble of operating the MFP.

It goes without saying that when user 80 transmits a print instruction of the print job to cloud server 170 using the operation panel of MFP 176, the same process takes place.

As described above, by the present embodiment, it is possible for the user to use portable terminal 172, which the user daily uses, to have MFP 176, which is seldom used, logged-in to cloud service he/she uses. Since only the routinely used cloud service is the object of selection in the user's own portable terminal, the process of selecting one from a large number of services is unnecessary. Therefore, the troublesome operation of operating MFP 176 to log-in to the cloud service is almost non-existent. Further, printing of a desired print job can be instructed using the familiar portable terminal 172, and printed by MFP 176. Therefore, the troublesome operation of operating MFP 176 can be avoided. Naturally, operation on the desired print job can also be done not through the portable terminal 172 but through MFP 176 and, therefore, as compared with the prior art, use of cloud service using MFP 176 can clearly be made easier for the user.

[Modifications]

In the embodiment above, when user 80 logs in to cloud server 170 both through portable terminal 172 and MFP 176, the home screen is displayed on both of them, and printing is not directly performed. The present invention, however, is not limited to such an embodiment. By way of example, when a document is to be printed on the road, it may be desirable to transmit a print job to cloud server 170 through portable terminal 172 and have it printed by MFP 176 immediately thereafter. For such a situation, an embodiment may be possible that when MFP 176 logs in to cloud server 170 and if there is any uploaded print job that is not yet printed, such a job is transmitted to MFP 176 and printing is started immediately.

The following is a modification for such a situation.

Specifically, when logged-in through MFP 176, before the step 580 shown in FIG. 22, a step, executed if there is any print job of the logged-in user which is not yet printed, of immediately transmitting such a print job to MFP 176 should be inserted. A flowchart of the process to be executed by cloud server 170 for this purpose is shown in FIG. 25.

Figure 25:
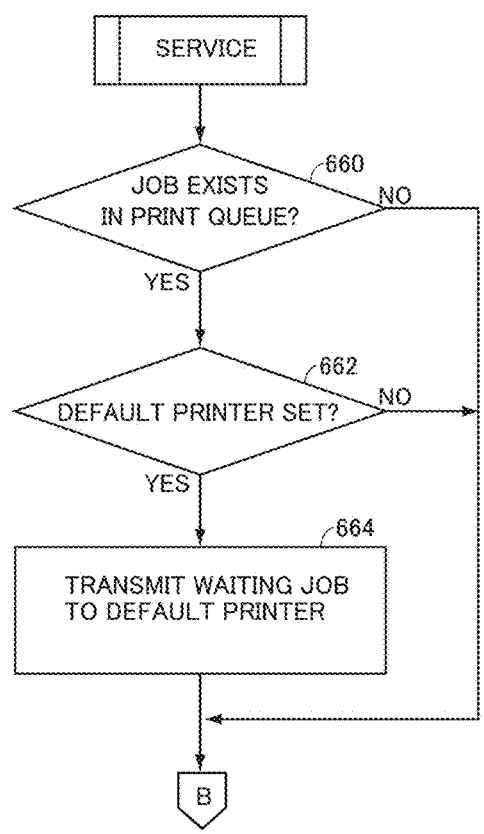
FIG. 25 is a flowchart representing a control structure of a program executed prior to the program portion of FIG. 21, when log-in of the user from the image forming apparatus succeeded in the cloud server of the system as a modification of the first embodiment.

Referring to FIG. 25, the process is executed prior to step 580 of FIG. 22, when log-in to cloud server 170 by portable terminal 172 or MFP 176 is completed. The process includes the step 660 of determining whether or not a print job of the logged-in user not yet printed (to-be-printed job) exists in cloud server 170, a step 662, executed if the determination at step 660 is positive, of determining whether or not a default printer is set for the user, and a step 664, executed when the determination at step 662 is positive, of transmitting the to-be-printed job to the default printer and ending the process. If the determinations at steps 660 and 662 are negative, no step is executed and the process ends.

According to the present modification, when user 80 uploads a print job to cloud server 170 in advance and then logs in to cloud server 170 from MFP 176 following the procedure described above, the process steps 660 (YES), 662 (YES) and 664 are executed, so that the to-be-printed job is transmitted to MFP 176 and printed. It is unnecessary for user 80 to operate portable terminal 172 or MFP 176 to select the job as the object of printing. As a result, the trouble for printing can be saved and the user can obtain the print data of desired document more easily.

In the present modification, in the program of which control structure is shown in FIG. 25, determination is made in the order of step 660 and step 662. These determinations, however, are independent from each other and, therefore, the steps may be done in different order. Steps 660 and 662 may be reversed. If determination is made in hardware manner, a circuit for determination of step 660 and a circuit for determination of step 662 may be provided in parallel and an AND of their outputs may be fed to a circuit for the process of step 664.

In the present embodiment, when a print job is transmitted from portable terminal 172 to cloud server 170, it is more desirable to transmit the print setting of cloud server 170 simultaneously, since a print-out can immediately be obtained in the form as desired by the user.

In the present embodiment, as long as MFP 176 is logged in to the cloud service using the log-in information from portable terminal 172, response of MFP 176 to a wireless access from another portable terminal is inhibited. Specifically, while a certain user is logged in, execution of the flowchart on the right side of FIG. 13 is stopped, or the process of step 380 is stopped. If there is such a portable terminal, a message such as "The apparatus is being used by another user. Please wait" may be displayed.

When the logged-in portable terminal logs-out from the cloud service, MFP 176 receives a notice to that effect from the server, and the control changes to respond to wireless access from another portable terminal. Here, identification information of the portable terminal of which access has been denied may be stored, and a notice that MFP 176 is now accessible may be transmitted.

Second Embodiment

In the system of the first embodiment, a print job is uploaded from information processing apparatus 62 and the print job is transmitted to MFP 176 to be printed. The present invention, however, is not limited to such an embodiment. The present invention is applicable to any system in which data is uploaded from an information processing apparatus to a cloud server and the data is printed by an MFP or the like.

The system in accordance with the second embodiment described in the following relates to a system providing the service of holding document data in a cloud server, through the cloud service. In the following, such a service will be referred to as document cloud service.

Figure 26:
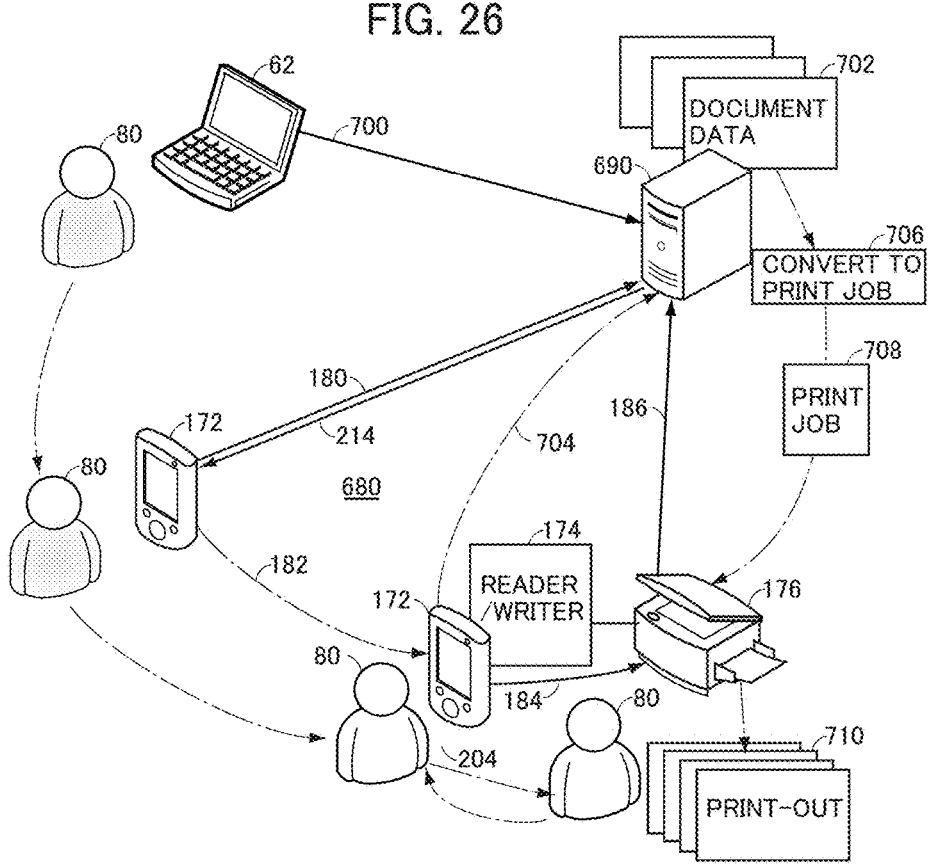
FIG. 26 is a block diagram showing a schematic structure of the cloud image output system in accordance with a second embodiment of the present invention.

Referring to FIG. 26, a document cloud service system 680 in accordance with the second embodiment includes information processing apparatus 62 and MFP 176 having the same hardware configurations as those of the first embodiment, and a cloud server 90, holding document data 700 uploaded from information processing apparatus 62 as document data 702, executes a process of converting document data 702 designated by a user to a print job 708, and transmitting it to a designated MFP 176 to be printed. In FIG. 26, the same components as those shown in FIG. 5 are denoted by the same reference characters.

Designation of a document may be done by user 80 through portable terminal 172 (print designation 704), or may be done by the user operating MFP 176. In either case, after user 80 logs in to cloud server 690 using portable terminal 172, by waving portable terminal 172 over the reader/writer 174 of MFP 176 (or putting portable terminal 172 on reader/writer 174), it is possible to have MFP 176 logged-in to cloud server 690, as in the first embodiment. Further, when portable terminal 172 or MFP 176 is operated to designate any of document data 702 and instruct printing, the document data 702 is converted to a print job 708 by the converting process 706 of cloud server 690, transmitted to MFP 176, and output as a print-out 710 on a recording medium such as paper. The troublesome process of selecting a desired service from among a large number of cloud services, as experienced when the user operates MFP 176 to log-in to a desired cloud server, is unnecessary. The user can easily obtain a print-out of a desired document data.

Figure 27:
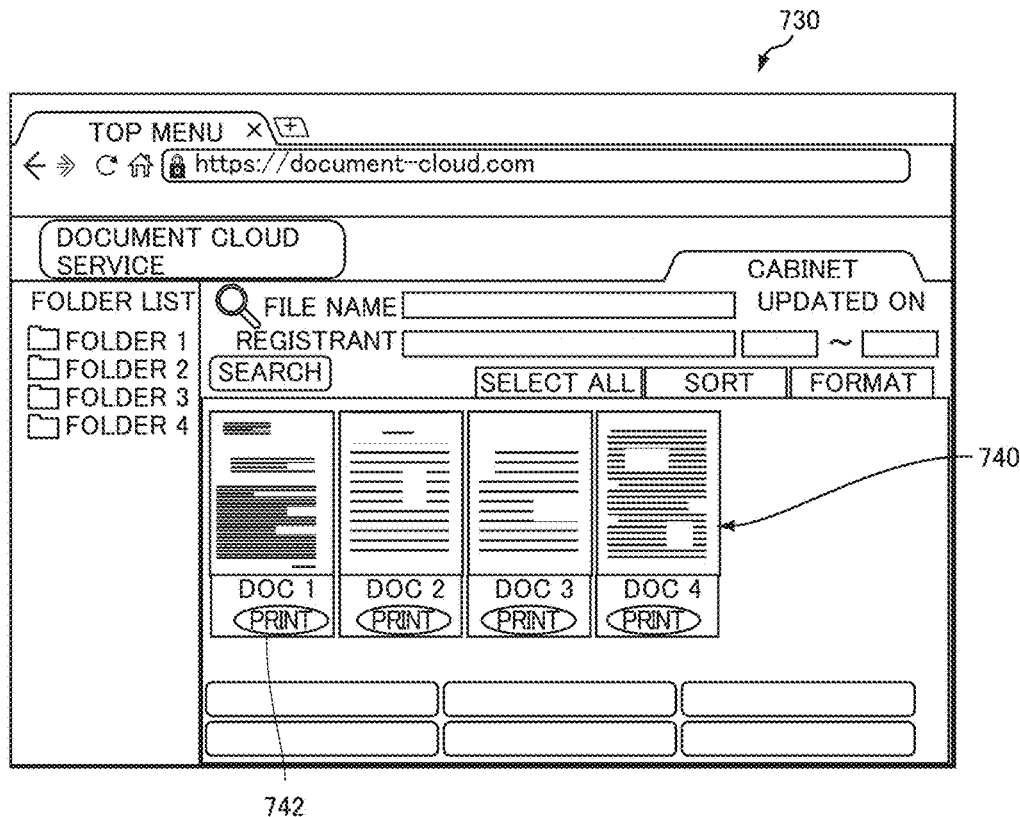
FIG. 27 schematically shows a document selection screen displayed on the portable terminal at the time of log-in to the cloud server in the second embodiment.

FIG. 27 shows a document selection menu screen 730 displayed, for example, on portable terminal 172 when it logs in to cloud server 690 in accordance with the second embodiment and a document printing process is selected. In the present embodiment, on document selection menu screen 730, a list 740 of user documents held in cloud server 690 is displayed. Each document has its document name and property, as well as a print button 742. By clicking or tapping the print button 742 allocated to the desired document, the document is converted to a print job in cloud server 690, and transmitted to a default printer of the user 80. At the time of log-in of MFP 176 to cloud server 690, MFP 176 is registered as the default server for user 80 and, therefore, print job 708 is transmitted to and printed by MFP 176.

Figure 28:
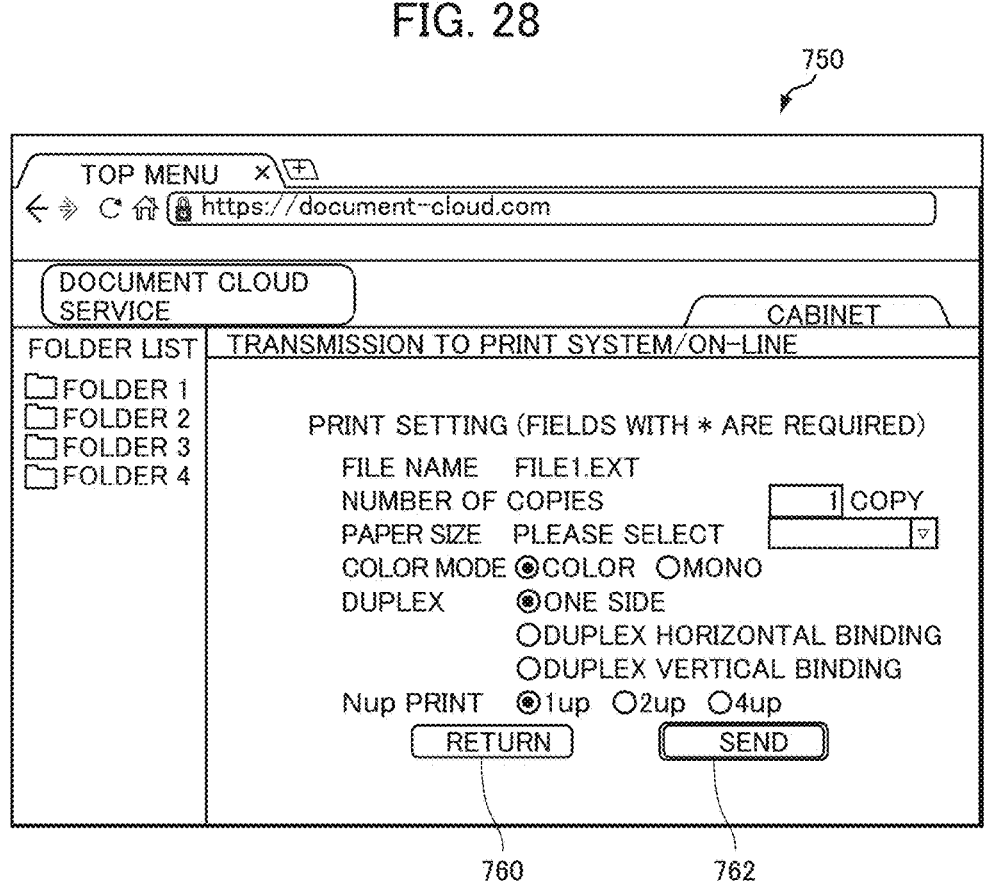
FIG. 28 schematically shows a print setting screen displayed on the portable terminal when a document is designated and a print button is pressed, on the document selection screen shown in FIG. 27.

When print button 742 is pressed, a print setting screen 750 such as shown in FIG. 28 may be displayed. When a document is designated and a print instruction is given to cloud server 690, the screen is transmitted from cloud server 690 to the terminal (portable terminal 172 or MFP 176) that issued the print instruction.

Referring to FIG. 28, a selected file name is displayed on print setting screen 750. In addition, setting of the number of copies, paper size, color mode (monochrome or color), duplex printing, a so-called N-up printing (printing N-pages on one sheet of recording paper) and so on is possible. At a lower portion of print setting screen 750, a "RETURN" button 760 and "SEND" button 762 are displayed. When "SEND" button is clicked or tapped, the print instruction for the document data designated by the "FILE NAME" is sent to cloud server 690, and the document data is printed by MFP 176.

As described above, by the second embodiment, in order to have a document saved in the document cloud service printed by an MFP, by first logging-in to the service using a portable terminal such as a portable telephone and thereafter conducting communication between a desired MFP and the portable terminal, it is possible to have the image forming apparatus to log-in to the same cloud document service. Further, when a desired document is selected and an operation for printing is done on the portable terminal, print data is automatically generated from the document and output to a desired MFP. Since a desired document can be output to a desired MFP using the user's well-accustomed portable terminal, it is possible to use the MFP and the cloud document service efficiently.

[Modification]

In the second embodiment described above, by first logging-in to the document cloud service using a portable terminal and thereafter conducting proximity communication between the portable terminal and the MFP, the MFP is logged in to the same service simultaneously. Thereafter, when the user designates a desired document on the portable terminal, the print data of the document is output to the desired MFP. The present invention, however, is not limited to such an embodiment. By way of example, rather than first logging-in to the document cloud service using a portable terminal and conducting communication between the portable terminal and the MFP, it is possible to select a document as the object of printing in advance on the portable terminal, conduct communication between the MFP and the portable terminal thereafter, and then to have the MFP logged-in to the cloud service. In such an approach, the document cloud server can know that the user, who has already logged in through a portable terminal, has now additionally logged in from an MFP and, in addition, the cloud document service also receives the information related to which document has been selected by the user before the log-in from the MFP. Therefore, when the user logs in through MFP, it is possible to immediately start printing of the selected document, without newly requesting the user to select the document. A program structure for this purpose will be described in the following, with respect to FIG. 29.

Figure 29:
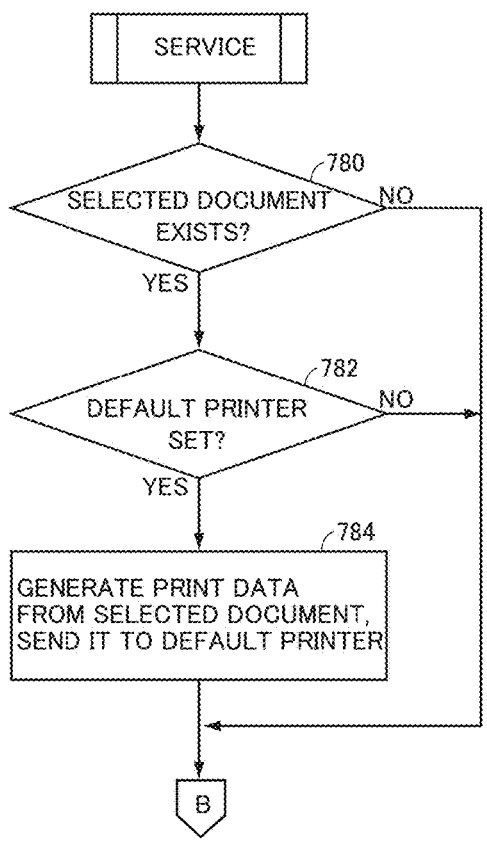
FIG. 29 is a flowchart representing a control structure of a program executed prior to the program portion corresponding to FIG. 21, when log-in of the user from the image forming apparatus succeeded in the cloud server of the system as a modification of the second embodiment.

The program shown in FIG. 29 is for realizing the modification of the second embodiment, and it is executed prior to the process corresponding to step 520 of FIG. 21, in the program for the second embodiment (the program of generating print data from document data and transmitting it to the MFP), which corresponds to the program of which control structure is shown in FIG. 22, of the first embodiment (the program of transmitting a print job to the MFP).

The program includes a step 780 of determining whether or not there is any document already selected for the user when log-in to the document cloud server by the portable terminal or the MFP is completed. If it is determined at step 780 that no document has been selected, no further step is executed and the control proceeds to the next process. If the determination at step 780 is positive, at step 782, whether a default printer is set or not is determined.

If the determination is positive, at step 784, print data is generated from the selected document, and sent to the default printer. Then, the process ends. If the determination at step 782 is negative, no further step is executed and the control proceeds to the next process.

In the following, the operation of the apparatus will be described, referring to a few examples.

<<A. First Logged-in by Portable Terminal and then Logged-in Also by MFP without Selecting any Document>>

When the user first logs in through the portable terminal, the determination at step 660 of FIG. 29 is negative and no process takes place in the program shown in FIG. 29.

When logged-in from the MFP thereafter, steps 534, 536 and 540 of the program corresponding to FIG. 20 are processed and thereby the MFP is set as the default printer for the user. In the process of FIG. 29, however, the determination at step 660 is negative and, therefore, no process takes place and the process of FIG. 29 ends.

<<B. First Logged-in by Portable Terminal and then Logged-in Also by MFP with a Document Selected>>

The process at the server when the user first logs in through the portable terminal is the same as Example A above, and no process takes place.

When a document is selected and thereafter the same user logs in through the MFP, steps 534, 536 and 540 of the program corresponding to FIG. 20 are processed and thereby the MFP is set as the default printer for the user. In the process of FIG. 29, determinations at steps 660 and 662 are both positive and, therefore, the process of step 664 is executed, and print data is generated from the selected document and output to the MFP.

<<C. First Logged-in by MFP and then Logged-in Also by Portable Terminal>>

When the user logs in through the MFP, steps 534, 536 and 540 of the program corresponding to FIG. 20 are processed and thereby the MFP is set as the default printer for the user. When the user logs in through the portable telephone thereafter, principally, no document has been selected and, therefore, the determination at step 660 is negative, and noting is printed by the process shown in FIG. 29.

<<D. First Logged-in by Portable Terminal and then Logged-in by Another Portable Terminal>>

In the present embodiment, such an operation is also possible. Here, unless the user logs in through the MFP, the determination at step 272 of FIG. 29 is always negative and, therefore, no document is printed at the time of log-in.

As described above, according to the present modification, after the user logs in to the document service using the portable terminal, by conducting proximity communication between the portable terminal and the MFP, the same user can log-in to the same document server through the MFP. In the portable terminal with which the MFP conducts proximity communication, by selecting a document saved in the document service, the print data of the document is automatically generated when the user logs in through the MFP, and the document is printed by the MFP. The time necessary for the user to stay in front of the MFP can be made shorter, and the user can save time. Further, on the side of the MFP, the time each user stays in front of the MFP becomes shorter and, hence, operation efficiency increases and more service can be provided to larger number of users.

In the present modification, in the program of which control structure is shown in FIG. 29, determination is made in the order of step 780 and step 782. These determinations, however, are independent from each other as in the modification of the first embodiment and, therefore, the steps may be done in different order. Steps 780 and 782 may be reversed. If determination is made in hardware manner, a circuit for determination of step 780 and a circuit for determination of step 782 may be provided in parallel and an AND of their outputs may be obtained.

As described above, by the system in accordance with each of the embodiments of the present invention, it is possible to easily obtain a print-out of a desired document from a desired cloud service in an apparatus such as MFP, which could be rather inconvenient because of its availability to log-in to a large number of cloud services.

As portable terminal 172 used in the embodiments above, a so-called portable telephone, a smart phone, a tablet-type computer, a notebook type computer or desk top computer may be used. Actually, an easily portable device makes it convenient for the user to use the system. The system, however, allows use of portable devices as well as less portable devices.

Further, in the embodiments above, as the necessary information to log-in to the cloud service, company ID, user name and password are used. The present invention, however, is not limited to such an embodiment. For example, if the cloud service is used not by a company, company ID is not used.

Further, in the embodiments above, when MFP 176 is logged in to cloud server 170 using portable terminal 172, a desired operation can be done using MFP 176. The present invention, however, is not limited to such embodiments. By way of example, when portable terminal 172 and MFP 176 log in to cloud server 170 simultaneously, using the same user information, only the operation through portable terminal 172 may be received and any operation through MFP 176 may be rejected. Alternatively, even when MFP 176 logs in to cloud server 170 using portable terminal 172, after log-in, only the operation through MFP 176 may be received.

Though cloud server 170 is described as stationary in the foregoing, actually, in the cloud service, the server is not specified. This is because a request is sent to an appropriate server in the cloud service and the log-in is executed. Therefore, when viewed from user 80, it is unnecessary to specify cloud server 170, and it is necessary only to specify a cloud server.

Further, reader/writer 174 is externally connected to MFP 176 in the foregoing. The present invention, however, is not limited to such an embodiment. MFP 176 may have the function of reader/writer 174. As to the method of proximity communication, though it is a common practice to use weak radio wave, it is not limiting.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

REFERENCE SIGNS LIST

50 cloud image output service
60, 110, 690 cloud server
62 information processing apparatus
64 IC card
66, 174 reader/writer
68, 176 MFP
80 user
82, 84, 708 print job
90, 122, 710 print-out
100 cloud file cabinet service
130 selection menu
172 portable terminal
680 document cloud service system
702 document data

The invention claimed is:

1. An image forming apparatus, comprising:
a display device;
a Central Processing Unit (CPU);
a memory; and
a printer that prints a print job received from a server; wherein
the CPU communicates with the server through a network and executes a log-in process to said server;
while the CPU executes the log-in process to said server for a specific user and whereby said specific user is being logged-in to said server, said printer receives through the CPU a print job, which is transmitted from said server in response to a print instruction without print destination designation issued to said server from an information terminal logged-in to said server by a same user as said specific user, and forms an image based on the received print job;
in response to said image forming apparatus being logged-in to said server, said CPU displays on said display device an operation screen image that enables a selection of same functions as those of an operation screen image that provides an instruction to the server displayed on said information terminal, and receives a print instruction from said operation screen image displayed on said display device; and
said printer further receives, via the CPU, a print job, which is transmitted from said server in response to a print instruction received by said CPU on said operation screen image displayed on said display device.

2. The image forming apparatus according to claim 1, wherein
the CPU communicates with an information terminal through proximity communication; and
the CPU receives, from the information terminal logged-in to the server, log-in information to log in to the server, and executes a log-in process to the server using the log-in information.

3. The image forming apparatus according to claim 2, wherein the
log-in information received from the information terminal through the CPU includes access information about access to the server managing a user being logged-in to said server, and log-in information of a user logged-in to the server using the information terminal.

4. The image forming apparatus according to claim 1, wherein as long as a user who has logged in to the server through the CPU is being logged in to the server, the CPU prevents log-in by another user.

* * * * *